(12) United States Patent
Hazenberg et al.

(10) Patent No.: US 9,021,720 B2
(45) Date of Patent: May 5, 2015

(54) FLUID-FILLED CHAMBER WITH A TENSILE MEMBER

(75) Inventors: Klaas P. Hazenberg, Portland, OR (US); Kirvan L. Chao, Portland, OR (US); Frederick J. Dojan, Vancouver, WA (US)

(73) Assignee: NIKE, Inc., Beaverton, OR (US)

( * ) Notice: Subject to any disclaimer, the term of this patent is extended or adjusted under 35 U.S.C. 154(b) by 667 days.

(21) Appl. No.: 13/049,256

(22) Filed: Mar. 16, 2011

(65) Prior Publication Data

US 2012/0233878 A1    Sep. 20, 2012

(51) Int. Cl.
| | | |
|---|---|---|
| A43B 1/00 | (2006.01) | |
| A43B 13/18 | (2006.01) | |
| A43B 13/20 | (2006.01) | |
| B29D 35/12 | (2010.01) | |

(52) U.S. Cl.
CPC .............. *A43B 13/189* (2013.01); *A43B 13/20* (2013.01); *B29D 35/122* (2013.01); *B29D 35/128* (2013.01)

(58) Field of Classification Search
CPC ........... A41F 1/00; A41F 9/025; A41F 1/006; A41F 15/02; A41F 3/00; A41F 9/002; A41F 9/02; A41F 15/002; A41F 17/04; A41F 11/00; A41F 11/14; A41F 13/00; A41F 15/00; A41F 15/005; A41F 15/007; A41F 17/00; A41F 17/02
USPC ................................ 36/29, 43, 44, 28, 35, 71
See application file for complete search history.

(56) References Cited

U.S. PATENT DOCUMENTS

| | | | |
|---|---|---|---|
| 4,183,156 A | | 1/1980 | Rudy |
| 4,219,945 A | | 9/1980 | Rudy |
| 4,906,502 A | * | 3/1990 | Rudy .............................. 428/69 |
| 4,936,029 A | | 6/1990 | Rudy |
| 5,042,176 A | | 8/1991 | Rudy |
| 5,543,194 A | * | 8/1996 | Rudy .............................. 428/69 |
| 5,625,964 A | | 5/1997 | Lyden et al. |
| 5,713,141 A | | 2/1998 | Mitchell et al. |
| 5,802,739 A | * | 9/1998 | Potter et al. ....................... 36/29 |
| 5,952,065 A | | 9/1999 | Mitchell et al. |
| 5,987,781 A | * | 11/1999 | Pavesi et al. ...................... 36/29 |

(Continued)

FOREIGN PATENT DOCUMENTS

| | | |
|---|---|---|
| WO | WO9938403 | 8/1999 |
| WO | WO2012061313 | 5/2012 |

OTHER PUBLICATIONS

International Search Report and Written Opinion in PCT Application No. PCT/US2012/028108, mailed on Jul. 10, 2012.

(Continued)

*Primary Examiner* — Clinton T Ostrup
*Assistant Examiner* — Catherine M Ferreira
(74) *Attorney, Agent, or Firm* — Honigman Miller Schwartz and Cohn LLP; Matthew H. Szalach; Jonathan P. O'Brien

(57) ABSTRACT

A fluid-filled chamber, which may be incorporated into articles of footwear and other products, may include an outer barrier and a tensile member. The outer barrier may have an upper portion, an opposite lower portion, and a peripheral edge. The upper portion and lower portion may be bonded together in a bonded region spaced inward from the peripheral edge. The bonded region may have a convex shape. The tensile member may be located within the outer barrier, and may be formed to have at least one gap. The bonded region may extend at least partially into the gap.

13 Claims, 31 Drawing Sheets

(56) References Cited

U.S. PATENT DOCUMENTS

| | | | |
|---|---|---|---|
| 6,013,340 | A | 1/2000 | Bonk et al. |
| 6,082,025 | A | 7/2000 | Bonk et al. |
| 6,127,026 | A | 10/2000 | Bonk et al. |
| 6,203,868 | B1 | 3/2001 | Bonk et al. |
| 6,321,465 | B1 * | 11/2001 | Bonk et al. .......... 36/28 |
| 6,374,514 | B1 * | 4/2002 | Swigart .......... 36/35 B |
| 6,385,864 | B1 * | 5/2002 | Sell et al. .......... 36/29 |
| 7,070,845 | B2 * | 7/2006 | Thomas et al. .......... 428/69 |
| 7,131,218 | B2 | 11/2006 | Schindler |
| 7,409,779 | B2 | 8/2008 | Dojan et al. |
| 7,588,654 | B2 | 9/2009 | Schindler et al. |
| 7,591,919 | B2 | 9/2009 | Schindler et al. |
| 8,151,486 | B2 * | 4/2012 | Dua .......... 36/29 |
| 8,572,867 | B2 * | 11/2013 | Parker .......... 36/29 |
| 2005/0097777 | A1 * | 5/2005 | Goodwin .......... 36/29 |
| 2005/0183287 | A1 | 8/2005 | Schindler |
| 2007/0169376 | A1 * | 7/2007 | Hatfield et al. .......... 36/29 |
| 2009/0288312 | A1 | 11/2009 | Dua |
| 2009/0288313 | A1 | 11/2009 | Rapaport et al. |
| 2011/0131831 | A1 | 6/2011 | Peyton et al. |

OTHER PUBLICATIONS

International Search Report and Written Opinion in PCT Application No. PCT/US2012/028101, mailed on Sep. 6, 2012.
International Search Report and Written Opinion in PCT Application No. PCT/US2012/027915, mailed on Aug. 27, 2012.
International Preliminary Report on Patentability for PCT/US2012/027915 mailed Sep. 26, 2013.

* cited by examiner

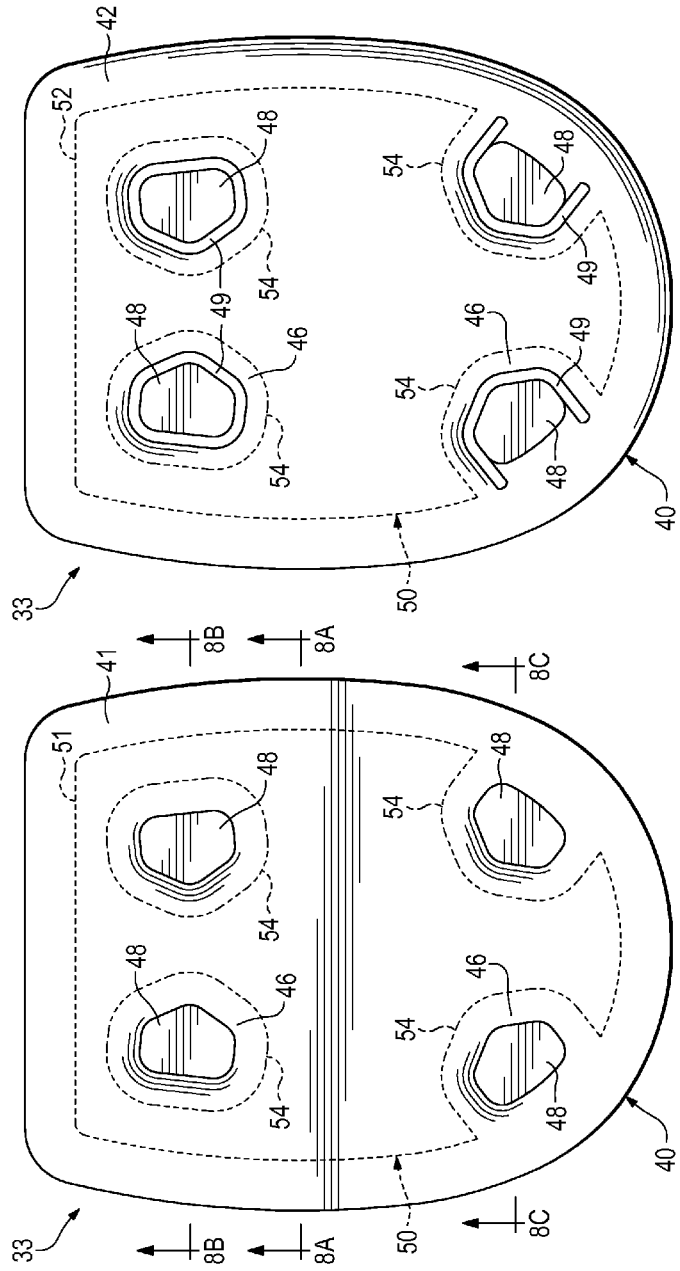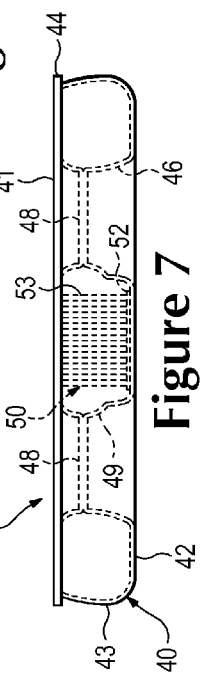

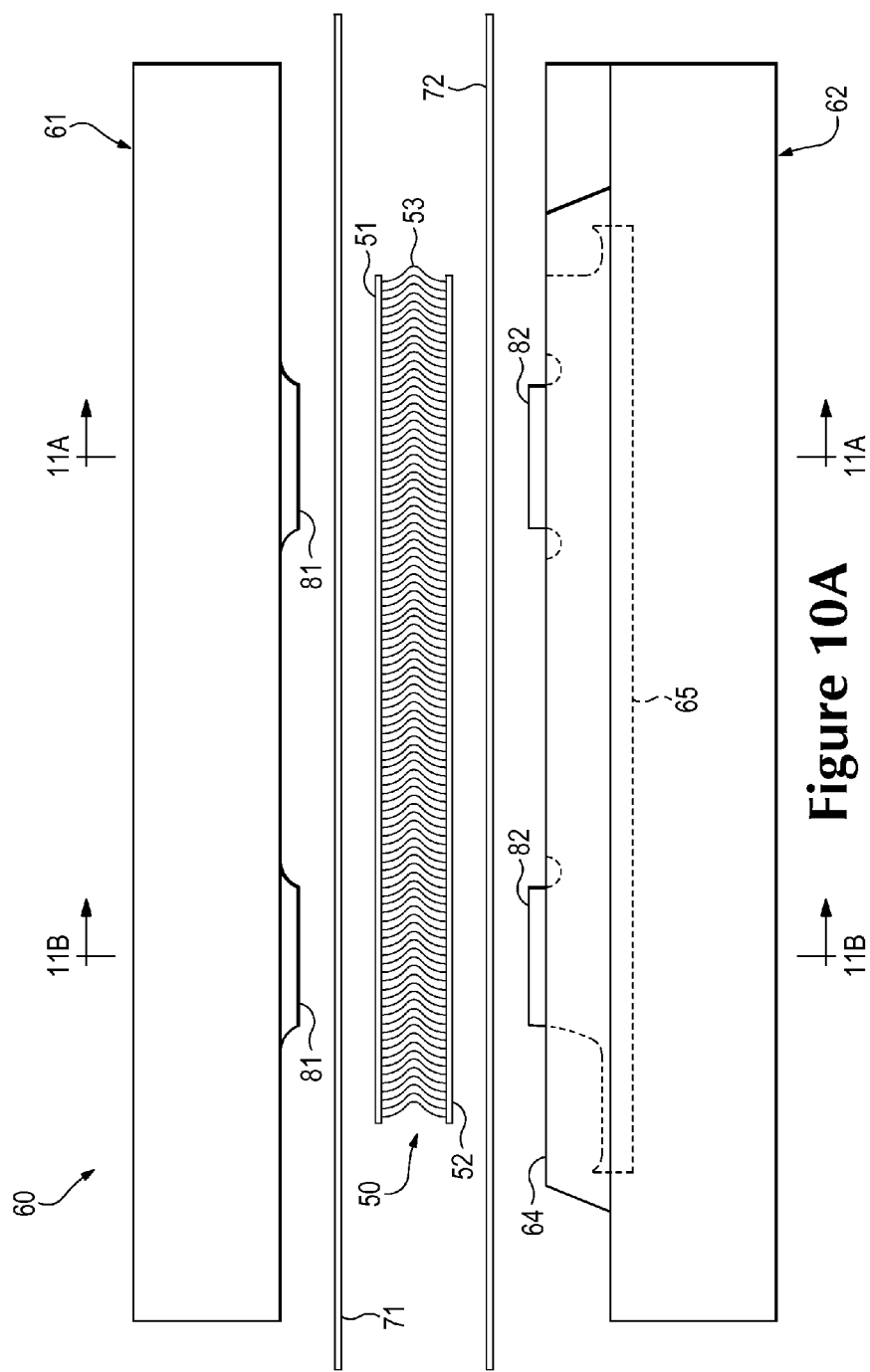

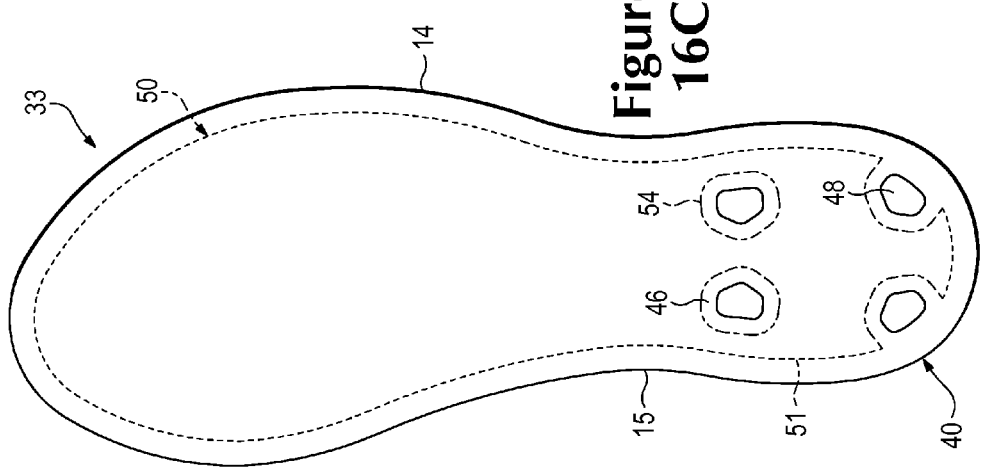
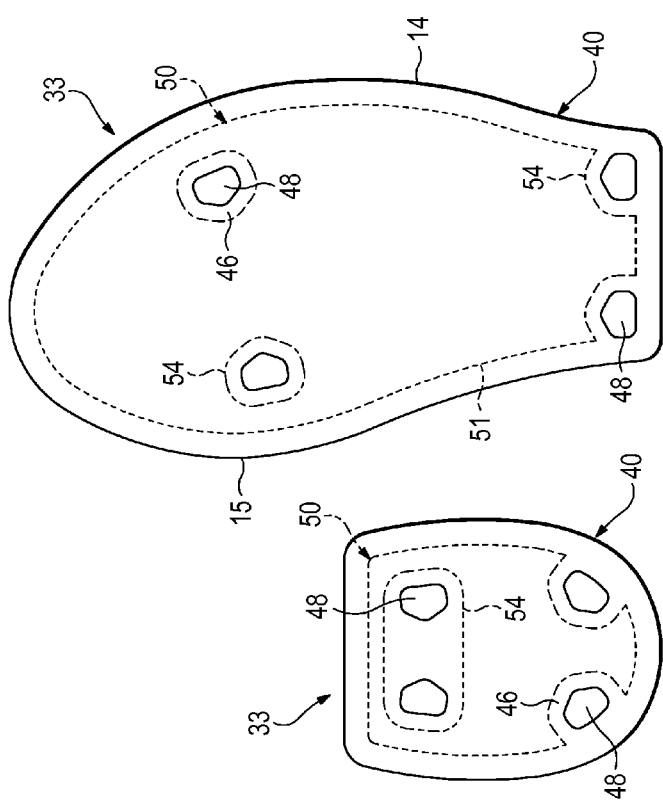
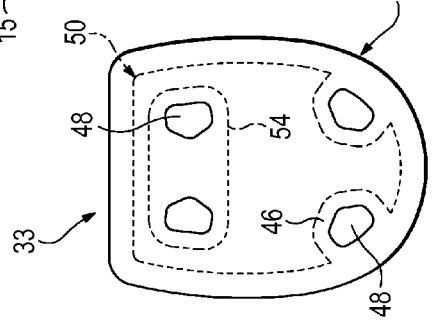

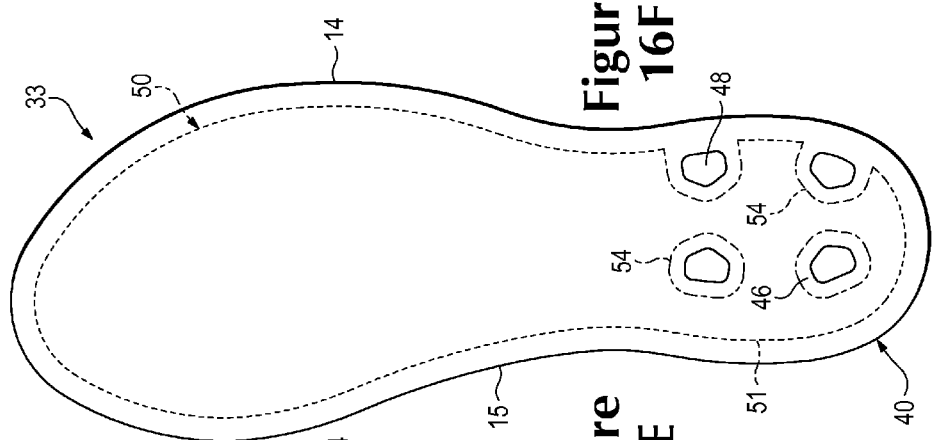
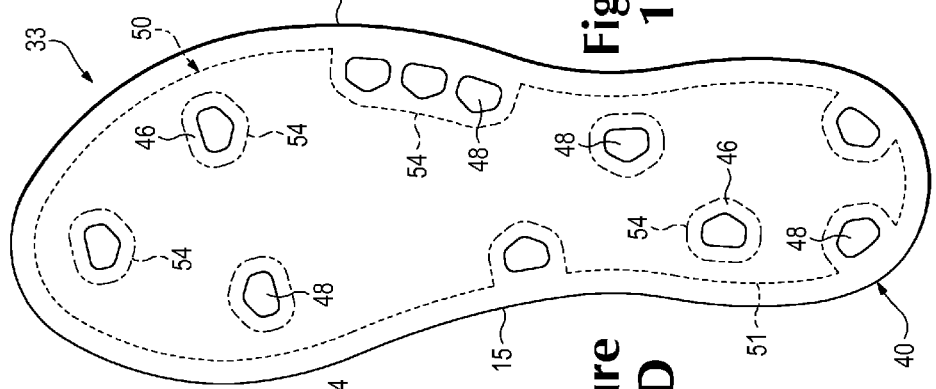
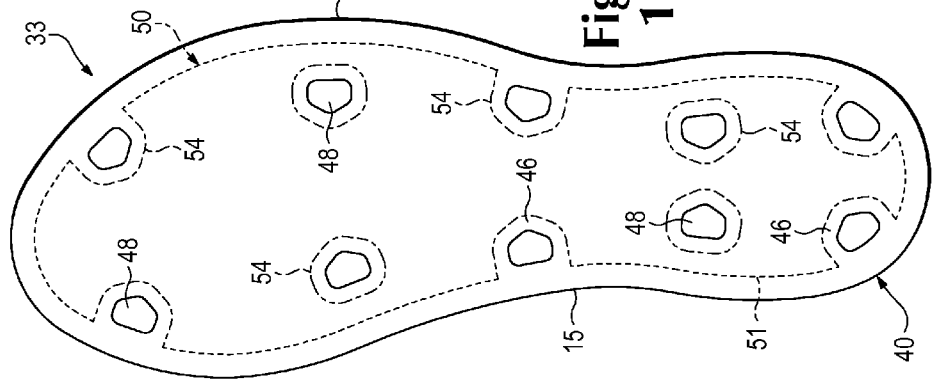

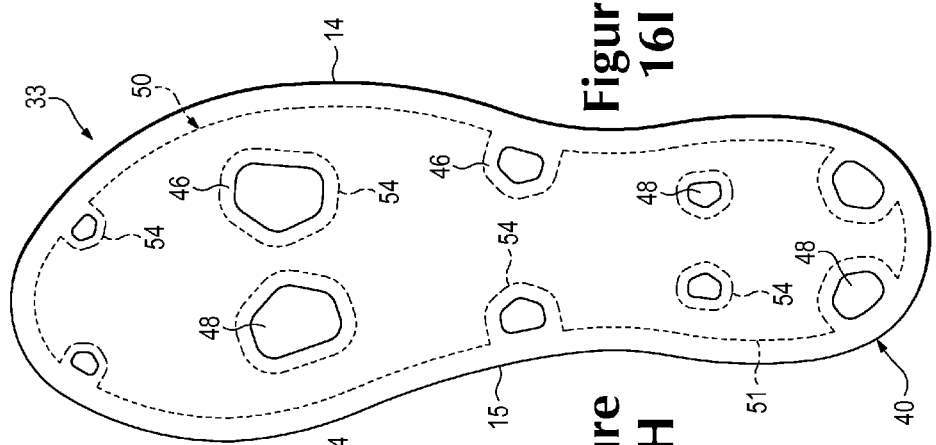
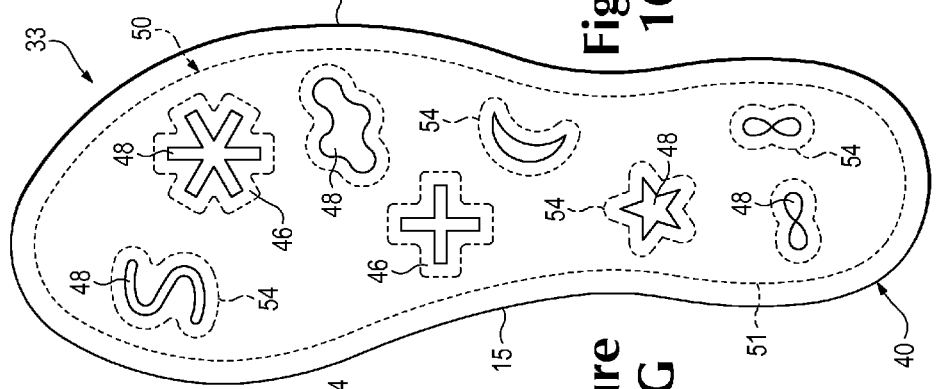
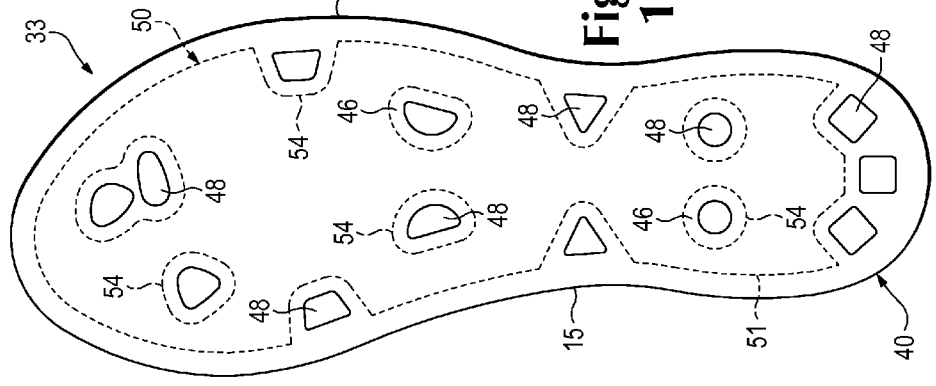

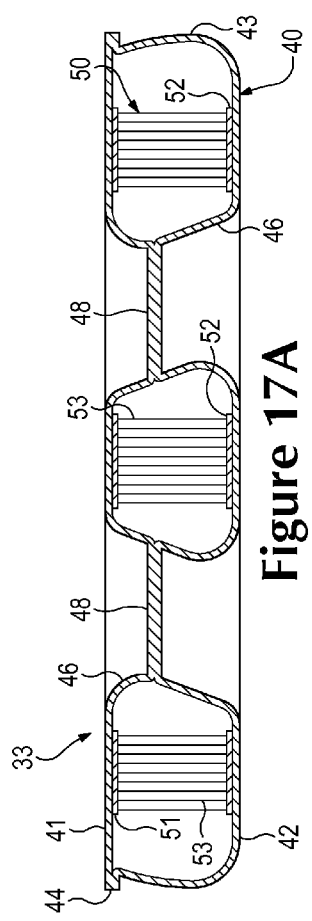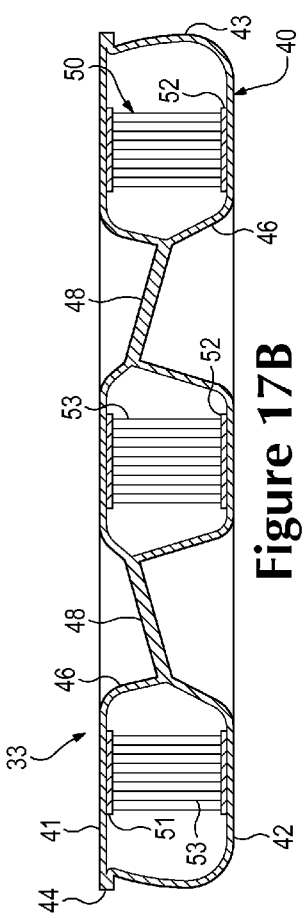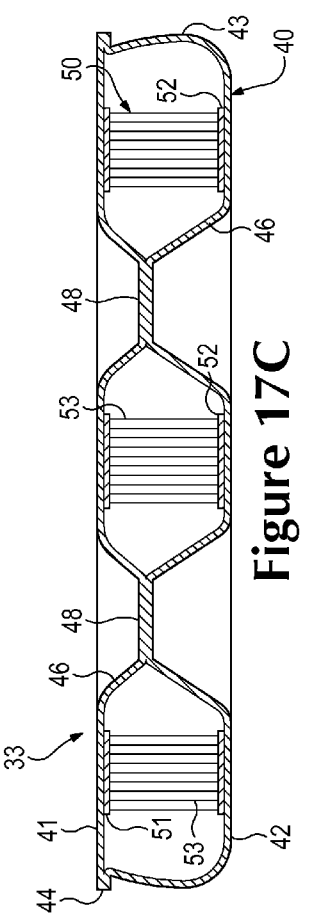

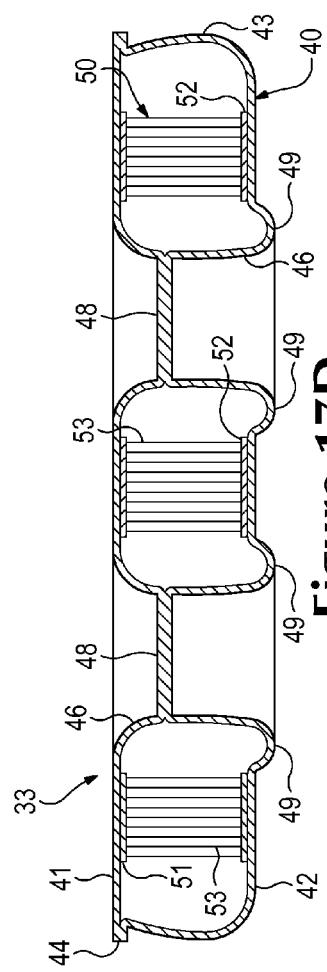
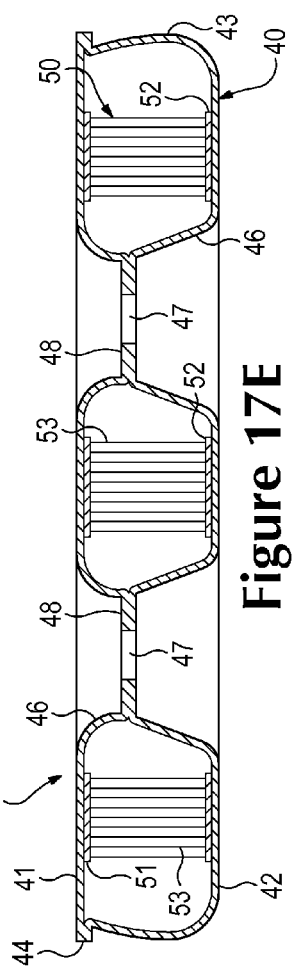
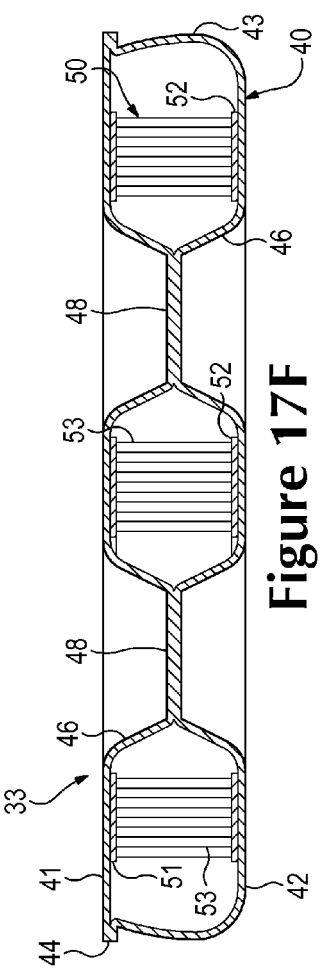
Figure 17D
Figure 17E
Figure 17F

FLUID-FILLED CHAMBER WITH A TENSILE MEMBER

BACKGROUND

Articles of footwear generally include two primary elements, an upper and a sole structure. The upper is formed from a variety of material elements (e.g., textiles, foam, leather, and synthetic leather) that are stitched or adhesively bonded together to form a void on the interior of the footwear for comfortably and securely receiving a foot. An ankle opening through the material elements provides access to the void, thereby facilitating entry and removal of the foot from the void. In addition, a lace is utilized to modify the dimensions of the void and secure the foot within the void.

The sole structure is located adjacent to a lower portion of the upper and is generally positioned between the foot and the ground. In many articles of footwear, including athletic footwear, the sole structure conventionally incorporates an insole, a midsole, and an outsole. The insole is a thin compressible member located within the void and adjacent to a lower surface of the void to enhance footwear comfort. The midsole, which may be secured to a lower surface of the upper and extends downward from the upper, forms a middle layer of the sole structure. In addition to attenuating ground reaction forces (i.e., providing cushioning for the foot), the midsole may limit foot motions or impart stability, for example. The outsole, which may be secured to a lower surface of the midsole, forms the ground-contacting portion of the footwear and is usually fashioned from a durable and wear-resistant material that includes texturing to improve traction.

The conventional midsole is primarily formed from a foamed polymer material, such as polyurethane or ethylvinylacetate, that extends throughout a length and width of the footwear. In some articles of footwear, the midsole may incorporate a variety of additional footwear elements that enhance the comfort or performance of the footwear, including plates, moderators, fluid-filled chambers, lasting elements, or motion control members. In some configurations, any of these additional footwear elements may be located between the midsole and the upper or between the midsole and the outsole, may be embedded within the midsole, or may be encapsulated by the foamed polymer material of the midsole, for example. Although many conventional midsoles are primarily formed from a foamed polymer material, fluid-filled chambers or other non-foam structures may form a majority of some midsole configurations.

SUMMARY

Various features of a fluid-filled chamber, which may be incorporated into articles of footwear and other products, are disclosed below. In one configuration, a fluid-filled chamber comprises an outer barrier and a tensile member. The outer barrier has an upper portion, an opposite lower portion, and a peripheral edge. The upper portion and lower portion are bonded together in a bonded region spaced inward from the peripheral edge. The bonded region has a convex shape. The tensile member is located within the outer barrier. The tensile member has at least one gap. The bonded region extends at least partially into a gap.

In another configuration, an article of footwear incorporates a sole structure, the sole structure comprising a midsole, a fluid-filled chamber, and an outsole. The midsole is formed from a polymer foam material. The fluid-filled chamber is incorporated with the midsole and includes an outer barrier and a tensile member. The outer barrier has an upper portion, an opposite lower portion, and a peripheral edge. At least one of the upper portion and the lower portion form an indented area spaced inward from the peripheral edge and extend into the chamber. The tensile member is located within the outer barrier. The tensile member has an aperture. The outsole is secured to at least one of the midsole and the fluid-filled chamber and forms at least part of a ground-contacting surface of the footwear. The indented area extends at least partially into the aperture, and the polymer foam material extends into the indented area.

In a further configuration, an article of footwear incorporates a sole structure, the sole structure comprising a midsole, a fluid-filled chamber, and an outsole. The midsole is formed from a polymer foam material. The fluid-filled chamber is incorporated with the midsole and includes an outer barrier and a tensile member. The outer barrier has an upper portion, an opposite lower portion, and a peripheral edge. At least one of the upper portion and the lower portion form a pair of indented areas spaced inward from the peripheral edge and extend into the chamber. The upper portion and lower portion are bonded together in a laterally-positioned bonded region and a medially-positioned bonded region, each of the bonded regions being located within one of the pair of indented areas. The tensile member is located within the outer barrier. The outsole is secured to at least one of the midsole and the fluid-filled chamber and forms at least part of a ground-contacting surface of the footwear. Each of the pair of bonded regions is at least partially separated from the tensile member.

In yet another configuration, an article of footwear incorporates a sole structure, the sole structure comprising a midsole, a fluid-filled chamber, and an outsole. The midsole is formed from a polymer foam material. The fluid-filled chamber is incorporated with the midsole and includes an outer barrier and a tensile member. The outer barrier has an upper portion, an opposite lower portion, and a peripheral edge. At least one of the upper portion and the lower portion forms a laterally-positioned indented area and a medially-positioned indented area. The indented areas are spaced inward from the peripheral edge and extend into the chamber. The upper portion and lower portion are bonded together in a laterally-positioned bonded region and a medially-positioned bonded region. The laterally-positioned bonded region is located within the laterally-positioned indented area, and the medially-positioned bonded region is located within the medially-positioned indented area. The tensile member is located within the outer barrier. The tensile member has a pair of apertures. One of the pair of apertures is a laterally-positioned aperture, and one of the pair of apertures is a medially-positioned aperture. The outsole is secured to at least one of the midsole and the fluid-filled chamber and forms at least part of a ground-contacting surface of the footwear. The laterally-positioned indented area extends at least partially into the laterally-positioned aperture, and the medially-positioned indented area extends at least partially into the medially-positioned aperture.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIG. 5 is a top plan view of the chamber.

FIG. 6 is a bottom plan view of the chamber.

FIG. 7 is a rear side elevational view of the chamber.

FIGS. 10A-10E are side elevational views of the mold depicting steps in the process for manufacturing the chamber.

FIGS. 16A-16I are top plan views corresponding with FIG. 5 and depicting additional configurations of the chamber.

FIGS. 17A-17F are cross-sectional views corresponding with FIG. 8B and depicting additional configurations of the chamber.

DETAILED DESCRIPTION

The following discussion and accompanying figures disclose various configurations of fluid-filled chambers and methods for manufacturing the chambers. Although the chambers are disclosed with reference to footwear having a configuration that is suitable for running, concepts associated with the chambers may be applied to a wide range of athletic footwear styles, including basketball shoes, cross-training shoes, football shoes, golf shoes, hiking shoes and boots, ski and snowboarding boots, soccer shoes, tennis shoes, and walking shoes, for example. Concepts associated with the chambers may also be utilized with footwear styles that are generally considered to be non-athletic, including dress shoes, loafers, and sandals. In addition to footwear, the chambers may be incorporated into other types of apparel and athletic equipment, including helmets, gloves, and protective padding for sports such as football and hockey. Similar chambers may also be incorporated into cushions and other compressible structures utilized in household goods and industrial products. Accordingly, chambers incorporating the concepts disclosed herein may be utilized with a variety of products.

General Footwear Structure

Figure 1:
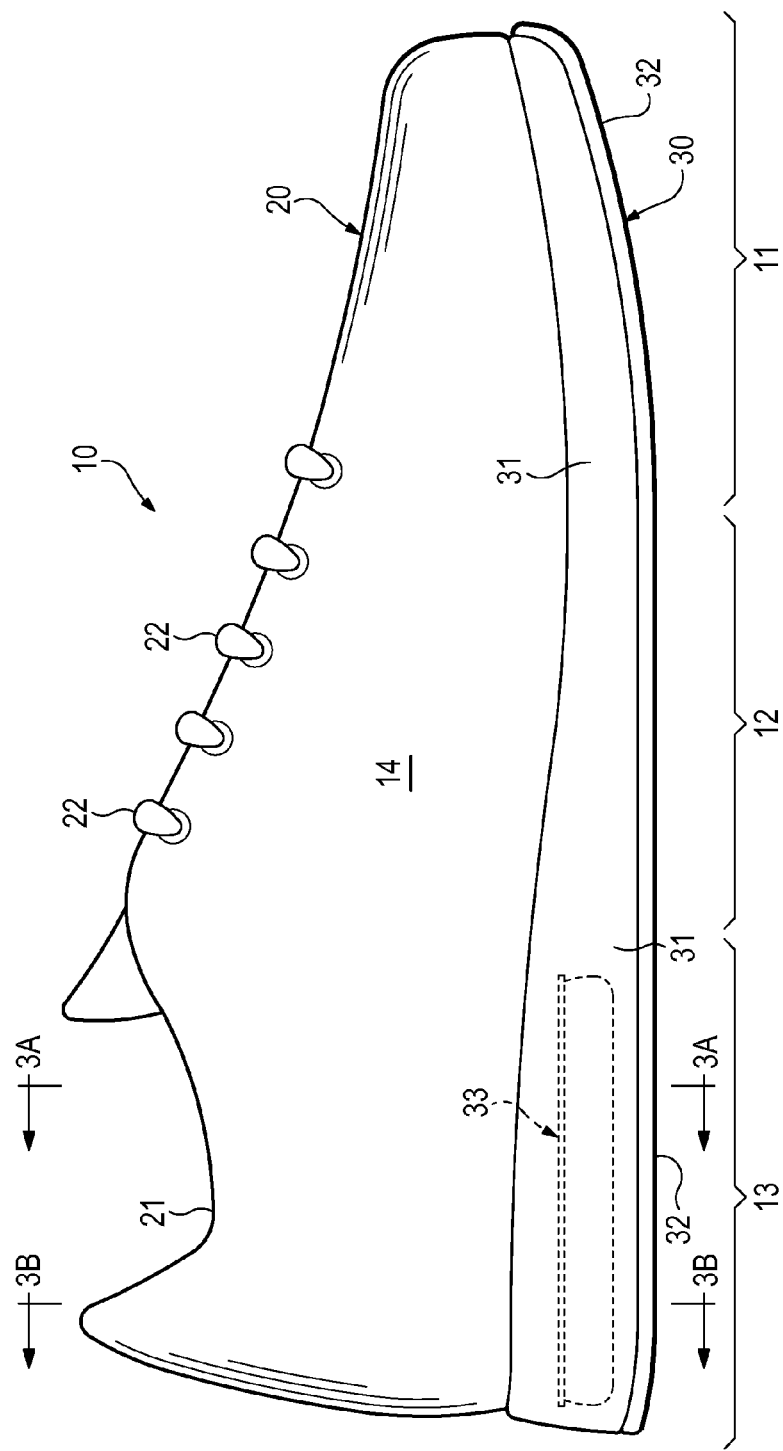
FIG. 1 is a lateral side elevational view of an article of footwear incorporating a fluid-filled chamber.
Figure 2:
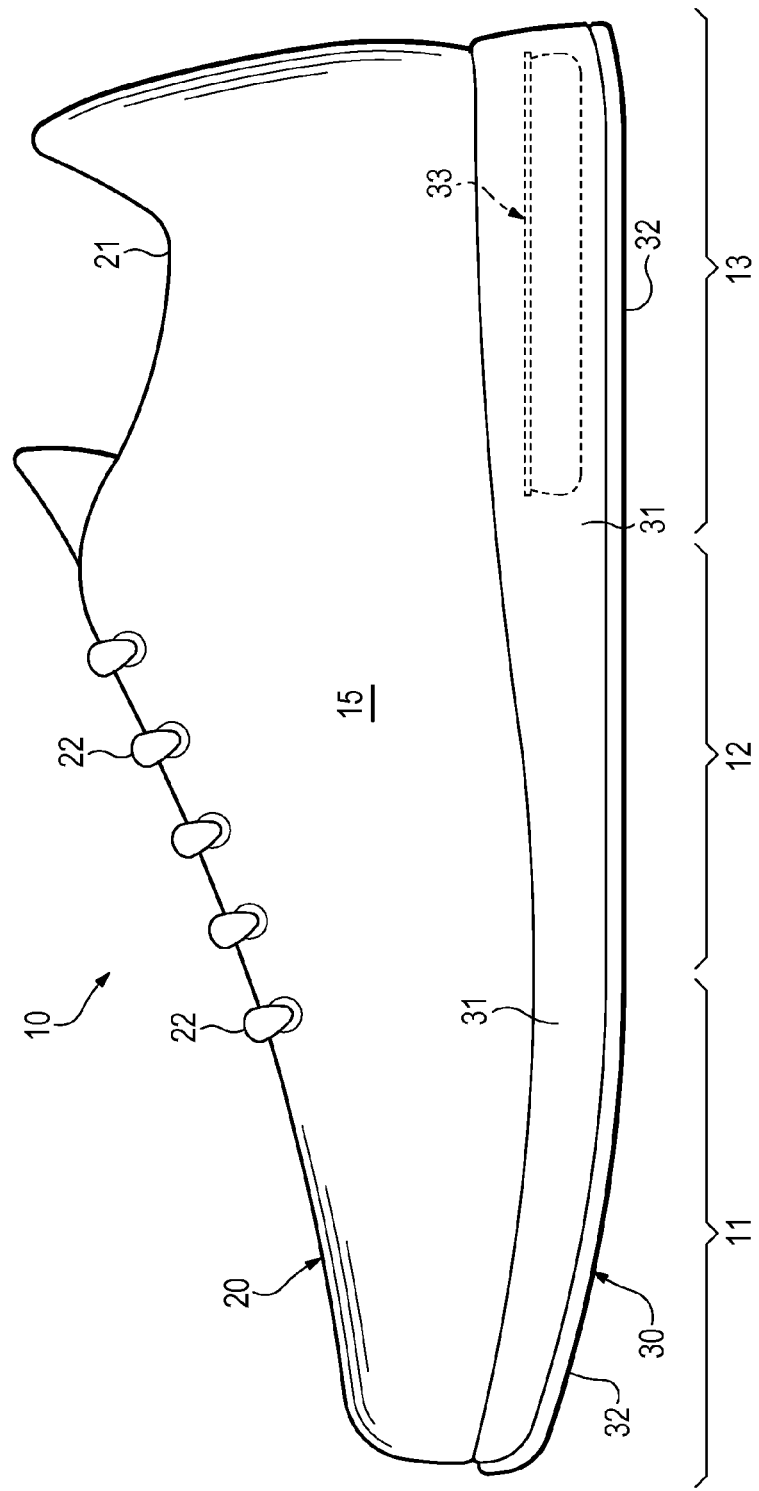
FIG. 2 is a medial side elevational view of the article of footwear.

An article of footwear 10 is depicted in FIGS. 1-3B as including an upper 20 and a sole structure 30. For reference purposes, footwear 10 may be divided into three general regions: a forefoot region 11, a midfoot region 12, and a heel region 13, as shown in FIGS. 1 and 2. Footwear 10 also includes a lateral side 14 and a medial side 15. Forefoot region 11 generally includes portions of footwear 10 corresponding with the toes and the joints connecting the metatarsals with the phalanges. Midfoot region 12 generally includes portions of footwear 10 corresponding with the arch area of the foot. Heel region 13 generally includes portions of footwear 10 corresponding with rear portions of the foot, including the calcaneus bone. Lateral side 14 and medial side 15 extend through each of regions 11-13 and correspond with opposite sides of footwear 10. Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to upper 20, sole structure 30, and individual elements thereof.

Upper 20 is depicted as having a substantially conventional configuration incorporating a plurality of material elements (e.g., textile, foam, leather, and synthetic leather) that are stitched, adhered, bonded, or otherwise joined together to form an interior void for securely and comfortably receiving a foot. The material elements may be selected and located with respect to upper 20 in order to selectively impart properties of durability, air-permeability, wear-resistance, flexibility, and comfort, for example. An ankle opening 21 in heel region 13 provides access to the interior void. In addition, upper 20 may include a lace 22 that is utilized in a conventional manner to modify the dimensions of the interior void, thereby securing the foot within the interior void and facilitating entry and removal of the foot from the interior void. Lace 22 may extend through apertures in upper 20, and a tongue portion of upper 20 may extend between the interior void and lace 22. Upper 20 may also incorporate a sockliner 23 that is located within the void in upper 20 and adjacent a plantar (i.e., lower) surface of the foot to enhance the comfort of footwear 10. Given that various aspects of the present application primarily relate to sole structure 30, upper 20 may exhibit the general configuration discussed above or the general configuration of practically any other conventional or non-conventional upper. Accordingly, the overall structure of upper 20 may vary significantly.

Sole structure 30 is secured to upper 20 and has a configuration that extends between upper 20 and the ground. In effect, therefore, sole structure 30 is located to extend between the foot and the ground. In addition to attenuating ground reaction forces (i.e., providing cushioning for the foot), sole structure 30 may provide traction, impart stability, and limit various foot motions, such as pronation. The primary elements of sole structure 30 are a midsole 31 and an outsole 32. Midsole 31 may be formed from a polymer foam material, such as polyurethane or ethylvinylacetate, that incorporates a fluid-filled chamber 33. In addition to the polymer foam material and chamber 33, midsole 31 may incorporate one or more other footwear elements that enhance the comfort, performance, or ground reaction force attenuation properties of footwear 10, including plates, moderators, lasting elements, or motion control members. Outsole 32, which may be absent in some configurations of footwear 10, is secured to a lower surface of midsole 31 and forms at least part of a ground-contacting surface of footwear 10. Outsole 32 may be formed from a rubber material that provides a durable and wear-resistant surface for engaging the ground. In addition, outsole 32 may also be textured to enhance the traction (i.e., friction) properties between footwear 10 and the ground. In further configurations, and depending upon the manner in which midsole 31 incorporates chamber 33, outsole 32 may be secured to midsole 31 alone, to chamber 33 alone, or to both midsole 31 and chamber 33.

As incorporated into footwear 10, chamber 33 has a shape that fits within a perimeter of midsole 31 and is primarily located in heel region 13. When the foot is located within upper 20, chamber 33 extends under a heel area of the foot (i.e., under a calcaneus bone of the wearer) in order to attenuate ground reaction forces that are generated when sole structure 30 is compressed between the foot and the ground during various ambulatory activities, such as running and walking. In other configurations, chamber 33 may extend through substantially all of footwear 10, from forefoot region 11 to heel region 13 and also from lateral side 14 to medial side 15, thereby having a shape that corresponds with an outline of the foot and extends under substantially all of the foot.

As depicted in FIGS. 1-3B, chamber 33 is substantially surrounded or otherwise encapsulated by midsole 31. In some configurations, however, chamber 33 may be at least partially exposed. In other configurations, outsole 32 may be secured to a lower surface of chamber 33. In further configurations, the polymer foam material of midsole 31 may be absent and chamber 33 may be secured to both upper 20 and outsole 32. Accordingly, the overall shape of chamber 33 and the manner in which chamber 33 is incorporated into footwear 10 may vary significantly.

Although chamber 33 is depicted and discussed as being a sealed chamber within footwear 10, chamber 33 may also be a component of a fluid system within footwear 10. More particularly, pumps, conduits, and valves may be joined with chamber 33 to provide a fluid system that pressurizes chamber 33 with air from the exterior of footwear 10 or a reservoir within footwear 10. As examples, chamber 33 may be utilized in combination with any of the fluid systems disclosed in U.S. Pat. No. 7,210,249 to Passke, et al. and U.S. Pat. No. 7,409,779 to Dojan, et al.

Chamber Configuration

Chamber 33 is depicted individually in FIGS. 4-8C in an initial configuration that is suitable for footwear applications. Chamber 33 has a substantially flat configuration, and when incorporated into footwear 10, chamber 33 corresponds with heel region 13 of midsole 31. Although the polymer foam material of midsole 31 is depicted as forming a sidewall of midsole 31, chamber 33 may be exposed on either or both of sides 14-15 to form a portion of the sidewall in some configurations of footwear 10. When the foot is located within upper 20, chamber 33 extends under a heel area of the foot in order to attenuate ground reaction forces that are generated when sole structure 30 is compressed between the foot and the ground during various ambulatory activities, such as running and walking. In other configurations, chamber 33 may have an alternate extent, such as extending under a forefoot area of the foot, or extending under substantially all of the foot.

The primary elements of chamber 33 are a barrier 40 and a tensile member 50. Barrier 40 (a) forms an exterior of chamber 33, (b) defines an interior void that receives both a pressurized fluid and tensile member 50, and (c) provides a durable sealed barrier for retaining the pressurized fluid within chamber 33. The polymer material of barrier 40 includes an upper barrier portion 41 oriented toward upper 20, an opposite lower barrier portion 42 oriented toward outsole 32, and a peripheral edge 43 that extends around a periphery of chamber 33 and between barrier portions 41 and 42.

As depicted in FIGS. 4-8C, tensile member 50 is located within the interior void and may be a textile tensile member. In other configurations, tensile member 50 may include elements that are not textile tensile members, such as any of the tether elements disclosed in U.S. patent application Ser. No. 12/630,642 to Peyton and U.S. patent application Ser. No. 12/777,167 to Peyton. In some configurations, tensile member 50 may be formed from, or be formed to include, a foam tensile member such as any of the foam tensile members disclosed in U.S. Pat. No. 7,131,218 to Schindler, U.S. Pat. No. 7,588,654 to Schindler et al., and U.S. Pat. No. 7,591,919 to Schindler et al.

Tensile member 50 includes an upper tensile layer 51, an opposite lower tensile layer 52, and a plurality of connecting members 53 that extend between tensile layers 51 and 52. Upper tensile layer 51 is secured to an inner surface of upper barrier portion 41 and lower tensile layer 52 is secured to an inner surface of lower barrier portion 42. Connecting members 53 may include yarns, fibers, or filaments formed of a variety of materials, and may be positioned across a length and a width of tensile member 50 at a relatively sparse density, a relatively packed density, or any other density. Although discussed in greater detail below, either adhesive bonding or thermobonding may be utilized to secure tensile member 50 to barrier 40. Additionally, tensile member 50 includes various gaps 54 in which barrier portions 41 and 42 are bonded to each other.

A wide range of polymer materials may be utilized for barrier 40. In selecting materials for barrier 40, engineering properties of the materials (e.g., tensile strength, stretch properties, fatigue characteristics, dynamic modulus, and loss tangent) as well as the ability of the materials to prevent the diffusion of the fluid contained by barrier 40 may be considered. When formed of thermoplastic urethane, for example, barrier 40 may have a thickness of approximately 1.0 millimeter, but the thickness may range from less than 0.25 to more than 2.0 millimeters, for example. In addition to thermoplastic urethane, examples of polymer materials that may be suitable for barrier 40 include polyurethane, polyester, polyester polyurethane, and polyether polyurethane. Barrier 40 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein a center layer is formed of ethylene-vinyl alcohol copolymer, layers adjacent to the center layer are formed of thermoplastic polyurethane, and outer layers are formed of a regrind material of thermoplastic polyurethane and ethylene-vinyl alcohol copolymer. Another suitable material for barrier 40 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al.

A variety of processes may be utilized to manufacture chamber 33. In general, the manufacturing processes involve (a) securing a pair of polymer sheets, which form barrier portions 41 and 42 as well as peripheral edge 43, to opposite sides of tensile member 50 (i.e., to tensile layers 51 and 52) and (b) forming a peripheral bond 44 that joins a periphery of the polymer sheets and may extend around peripheral edge 43. Peripheral bond 44 is depicted as being adjacent to the upper surface of chamber 33, but may be positioned between the upper and lower surfaces of chamber 33, or may be adjacent to the lower surface of chamber 33. The thermoforming process may also (a) locate tensile member 50 within chamber 33, (b) bond tensile member 50 to each of barrier portions 41 and 42, and (c) bond barrier portions 41 and 42 to each other within gaps 54. Although substantially all of the thermoforming process may be performed with a mold, as described in greater detail below, each of the various parts or steps of the process may be performed separately in forming chamber 33. That is, a variety of other methods may be utilized to form chamber 33.

In order to facilitate bonding between tensile member 50 and barrier 40, polymer supplemental layers may be applied to each of tensile layers 51 and 52. When heated, the supplemental layers soften, melt, or otherwise begin to change state so that contact with barrier portions 41 and 42 induces material from each of barrier 40 and the supplemental layers to intermingle or otherwise join with each other. Upon cooling, therefore, the supplemental layers are permanently joined with barrier 40, thereby joining tensile member 50 with barrier 40. In some configurations, thermoplastic threads or strips may be present within tensile layers 51 and 52 to facilitate bonding with barrier 40, as disclosed in U.S. Pat. No. 7,070,845 to Thomas, et al., or an adhesive may be utilized to secure barrier 40 and tensile member 50.

Following the thermoforming process, or as part of the thermoforming process, a fluid may be injected into the interior void and pressurized between zero and three-hundred-fifty kilopascals (i.e., approximately fifty-one pounds per square inch) or more. The pressurized fluid exerts an outward force upon barrier 40, which tends to separate barrier portions 41 and 42. Tensile member 50, however, is secured to each of barrier portions 41 and 42 in order to retain the intended shape of chamber 33 when pressurized. More particularly, connecting members 53 extending across the interior void are placed in tension by the outward force of the pressurized fluid upon barrier 40, thereby preventing barrier 40 from expanding outward and causing chamber 33 to retain an intended shape. Whereas peripheral bond 44 joins the polymer sheets to form a seal that prevents the fluid from escaping, tensile member 50 prevents barrier 40 from expanding outward or otherwise distending due to the pressure of the fluid. That is, tensile member 50 effectively limits the expansion of chamber 33 to retain an intended shape of barrier portions 41 and 42.

The lengths of connecting members 53 are substantially constant throughout tensile member 50, which imparts the parallel configuration to each of tensile layers 51 and 52. In some configurations, however, the lengths of connecting members 53 may vary to impart a contoured configuration to chamber 33. For example, chamber 33 may taper or may form a depression due to differences in the lengths of connecting members 53. Examples of contoured tensile members are disclosed in U.S. patent application Ser. No. 12/123,612 to Dua and Ser. No. 12/123,646 to Rapaport, et al. Additionally, tensile member 50 may be a textile tensile member. Tensile member 50 may be cut or formed from a larger element of a spacer textile. Alternately, each of tensile elements 51 and 52 may be formed to have a variety of configurations through, for example, a flat-knitting process, as in U.S. patent application Ser. No. 12/123,612 to Dua.

Suitably configured, tensile member 50 may have any of a range of configurations, including the range of configurations disclosed in U.S. patent application Ser. No. 12/123,612 to Dua, U.S. patent application Ser. No. 12/123,646 to Rapaport, et al., and U.S. patent application Ser. No. 12/630,642 to Peyton. In some configurations, chamber 33 may incorporate a valve or other structure that permits the individual to adjust the pressure of the fluid. Additionally, chamber 33 may be incorporated into a fluid system, similar to a fluid system disclosed in U.S. Pat. No. 7,409,779 to Dojan, et al., that varies the pressure within barrier 40 depending upon, for example, the running style or weight of the wearer.

Figure 3A:
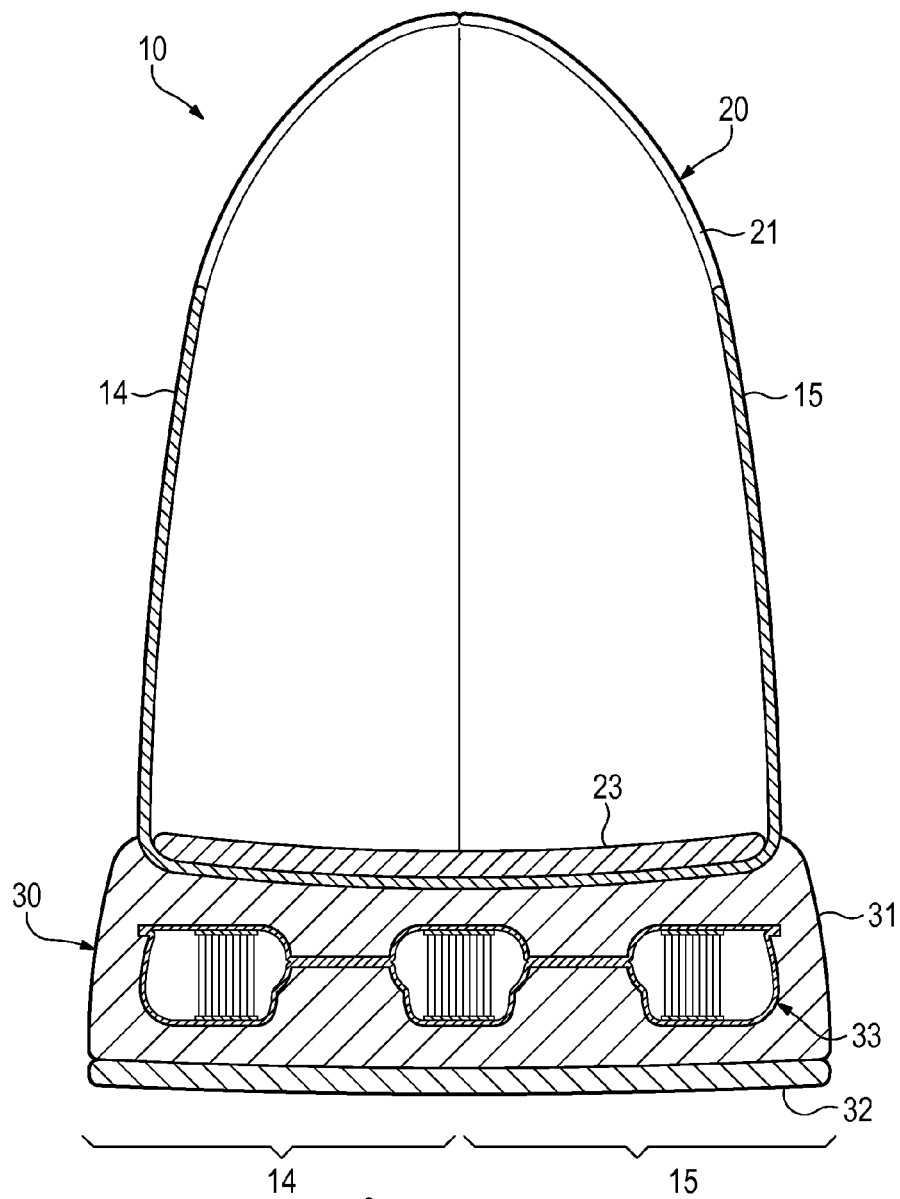
FIGS. 3A and 3B are cross-sectional views of the article of footwear, as defined by section lines 3A-3A and 3B-3B in FIG. 1.
Figure 3B:
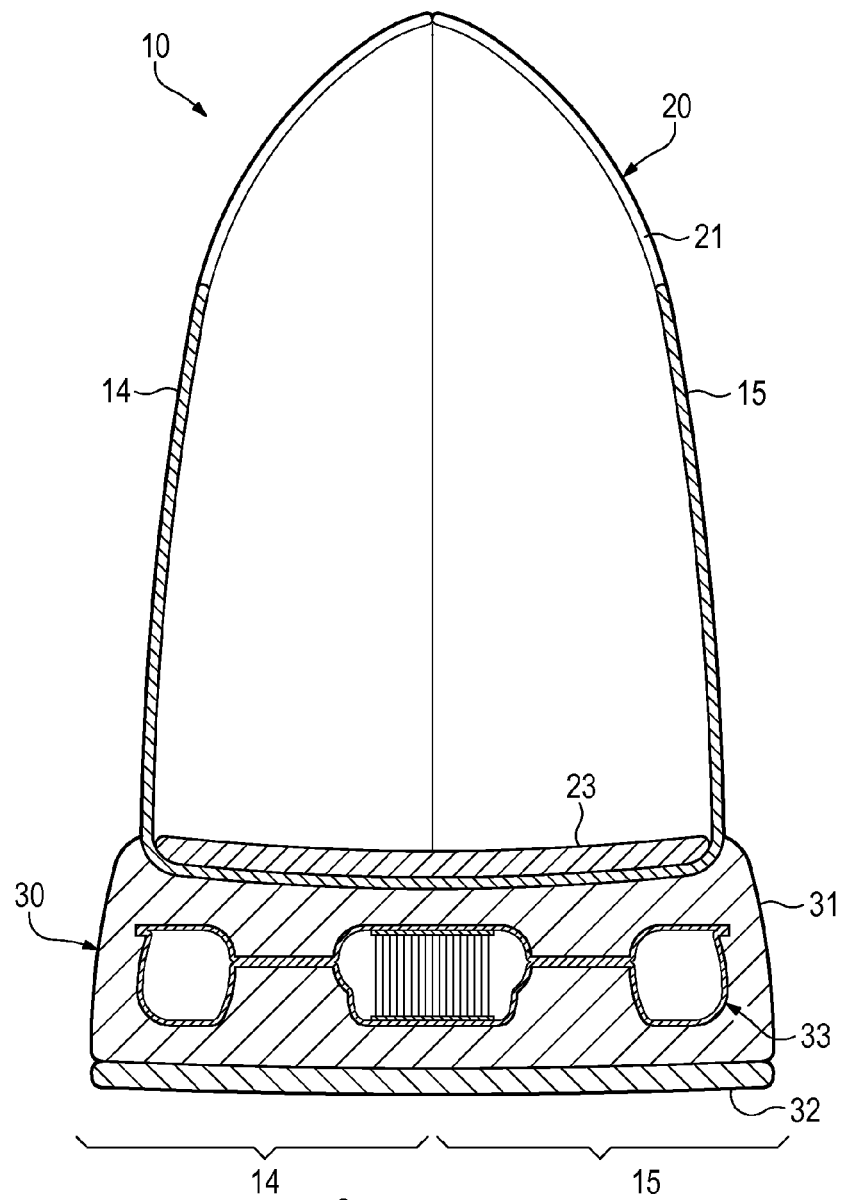
Figure 4:
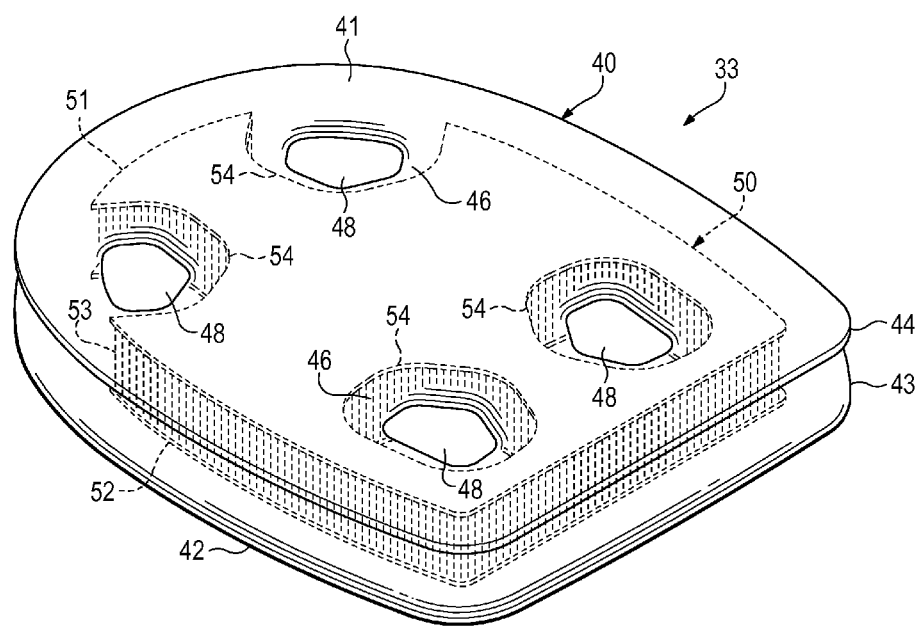
FIG. 4 is a perspective view of the chamber.
Figure 8A:
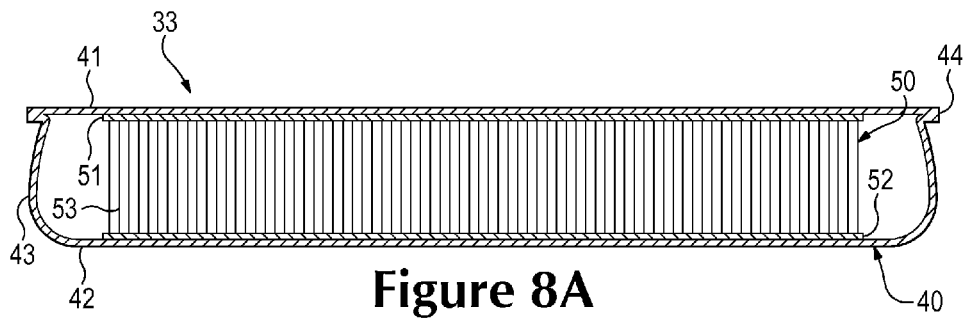
FIGS. 8A-8C are cross-sectional views of the chamber, as defined by section lines 8A-8A through 8C-8C in FIG. 5.
Figure 8B:
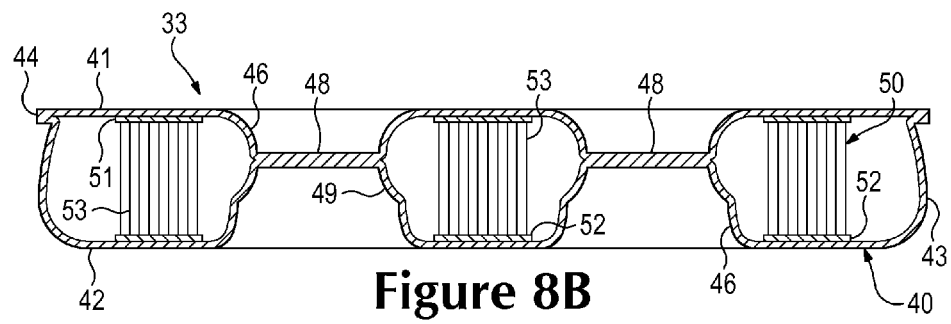
Figure 8C:
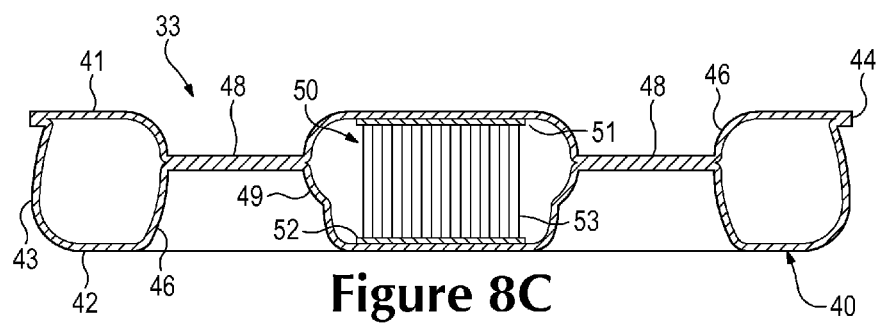

As discussed above, tensile member 50 includes various gaps 54 in which barrier portions 41 and 42 are bonded to each other. More particularly, chamber 33 may include various indented areas 46 that extend into gaps 54, and indented areas 46 may form various bonded regions 48 where barrier portions 41 and 42 are bonded to each other. Although the configuration of chamber 33 may vary significantly, indented areas 46 may be spaced inward from peripheral edge 43 and peripheral bond 44 and may extend into chamber 33. When incorporated into footwear 10, the polymer foam material of midsole 31 may extend into indented areas 46, as depicted in FIGS. 3A and 3B. The polymer foam material of midsole 31 may accordingly fill one or more indented areas 46. Referring to FIGS. 4-8C, both upper barrier portion 41 and lower barrier portion 42 are formed to include indented areas 46. However, in other configurations, either upper barrier portion 41 alone or lower barrier portion 42 alone may be formed to include indented areas 46.

Barrier portions 41 and 42 may also be formed to include bonded regions 48, which may be formed within indented areas 46. Bonded regions 48 may be spaced inward from peripheral edge 43 and peripheral bond 44, and may be regions in which upper barrier portion 41 and lower barrier portion 42 are bonded, joined, or otherwise secured together (e.g., through thermobonding, adhesive bonding, or a mechanical fastener). In turn, fluid within chamber 33 extends between the areas of (a) peripheral edge 43 and (b) indented areas 46 and bonded regions 48. Additionally, bonded regions 48 may extend at least partially into one or more gaps 54 in tensile member 50. For example, a gap 54 may be an aperture extending through tensile member 50, and bonded regions 48 may extend at least partially into gap 54 and may be surrounded by tensile member 50. Similarly, at least part of an indented area 46 may extend into and be surrounded by gap 54. Suitably configured, indented areas 46, bonded regions 48, or both may alter one or more properties of footwear 10, such as a stability, flexibility, stiffness, rigidity, or force attenuation of footwear 10. More particularly, by selecting the locations, sizes, depths, or other properties of indented areas 46 and bonded regions 48, the properties of footwear 10 may be selected to accommodate specific athletic activities, the running style of the wearer, or the needs of a particular individual.

As an additional matter, each of bonded regions 48 and indented areas 46 may exhibit a convex shape. That is, for any two points within a bonded region 48, a straight line connecting those two points is also within that bonded region 48. The convex shapes of bonded regions 48 and indented areas 46 may alter one or more properties of bonded regions 48, such as a compactness of bonded regions 48 within chamber 33, or a uniformity of the material of barrier 40 at the transition between (a) bounded regions 48 and (b) portions of indented areas 46 outside of bounded regions 48. An advantage to forming bonded regions 48 and indented areas 46 to have a convex shape is that the sizes of indented areas 46 and bonded regions 48 are relatively small, while still providing the ability to select the properties of footwear 10. In some configurations of chamber 33, however, bonded regions 48 may have a non-convex shape.

Upper barrier portion 41, lower barrier portion 42, or both may also be formed to include distended regions 49. Distended regions 49 may be formed in areas of barrier portions 41 and 42 between bonded regions 48 and tensile member 50. When pressurized, distended regions 49 may enhance an outward expansion of chamber 33 in portions of barrier 40 between bonded regions 48 and tensile member 50.

As depicted in FIGS. 4-8C, chamber 33 has four bonded regions 48, each located within an indented area 46. Two bonded regions 48 are laterally-positioned and two bonded regions 48 are medially-positioned. Similarly, two bonded regions 48 are substantially symmetrically positioned in a heel-midfoot interface region of chamber 33, and two bonded regions 48 are substantially symmetrically positioned in a heel-most region of chamber 33. In other words, bonded regions 48 are (a) laterally-positioned in the heel-midfoot interface region of chamber 33, (b) medially-positioned in the heel-midfoot interface region of chamber 33, (c) laterally-positioned in the heel-most region of chamber 33, and (d) medially-positioned in the heel-most region of chamber 33.

In the heel-midfoot interface region of chamber 33, bonded regions 48 extend at least partially into gaps 54 in tensile member 50. In other words, bonded regions 48 are at least partially separated from the tensile member. In the heel-midfoot interface region, gaps 54 are apertures through tensile member 50 and are spaced inward from edges of tensile member 50. That is, gaps 54 in the heel-midfoot interface region may be holes through both upper tensile layer 51 and lower tensile layer 52. In contrast, in the heel-most region of chamber 33, gaps 54 are recesses or indentations into the edges of tensile member 50. That is, gaps 54 in the heel-most region may be indented areas of a perimeter of tensile member 50, or areas in which a distance between tensile member 50 and peripheral edge 43 is significantly greater than the average distance between tensile member 50 and peripheral edge 43 within chamber 33.

As depicted in FIGS. 4-8C, a distal boundary of each bonded region 48 is substantially parallel with that portion of peripheral edge 43 nearest to the distal boundary. That is, where closest to peripheral edge 43, bounded regions 48 are substantially parallel to peripheral edge 43. In other configurations, the distal boundary of each bonded region 48 may be curved or otherwise arcuate, or may have an angular bend, or may be otherwise not parallel with the portion of the peripheral edge 43 nearest to the distal boundary.

Manufacturing Process

Figure 9:
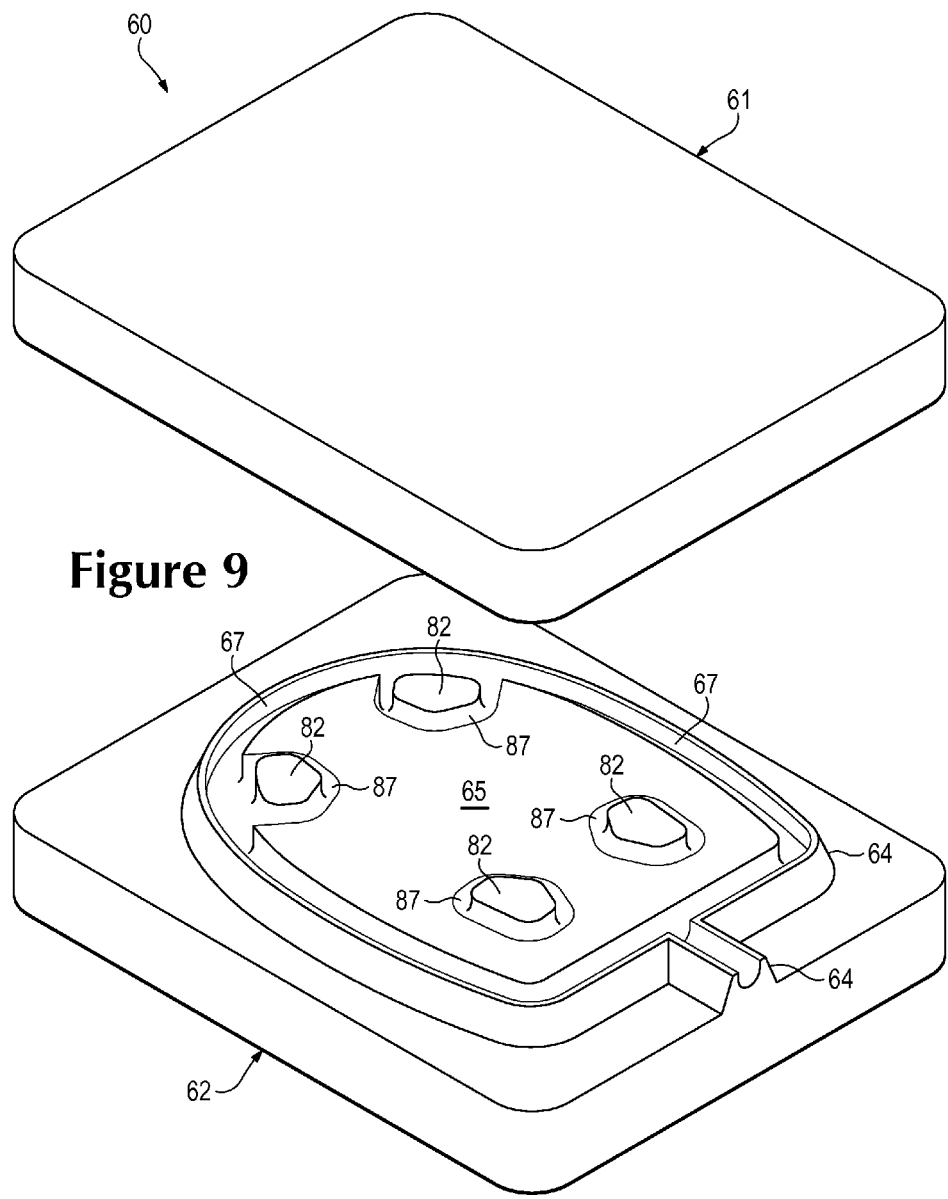
FIG. 9 is a perspective view of a mold that may be utilized in a process for manufacturing the chamber.

Although a variety of manufacturing processes may be utilized to form chamber 33, an example of a suitable thermoforming process will now be discussed. With reference to FIG. 9, a mold 60 that may be utilized in the thermoforming process is depicted as including an upper mold portion 61 and a lower mold portion 62. Mold 60 is utilized to form chamber 33 from a pair of polymer sheets that are molded and bonded to define barrier portions 41 and 42 as well as peripheral edge 43, and the thermoforming process secures tensile member 50 within barrier 40. More particularly, mold 60 (a) imparts shape to one of the polymer sheets in order to form upper barrier portion 41, (b) imparts shape to the other of the polymer sheets in order to form lower barrier portion 42, (c) imparts shape to the polymer sheets in order to form peripheral edge 43, and to form peripheral bond 44 to join a periphery of the polymer sheets, (d) locates tensile member 50 within chamber 33, and (e) bonds tensile member 50 to each of barrier portions 41 and 42.

In preparation for the manufacturing process, various elements forming chamber 33 may be obtained and organized. For example, an upper polymer layer 71 and a lower polymer layer 72, which form barrier 40, may be cut to a desired shape. Tensile member 50 is in a compressed state at this stage of the manufacturing process, wherein textile layers 51 and 52 lie adjacent to each other and connecting members 53 are in a collapsed state. Upon completion of the manufacturing process, when chamber 33 is pressurized, tensile member 50 is placed in tension, which spaces textile layers 51 and 52 from each other and induces connecting members 53 to straighten.

In manufacturing chamber 33, one or more of upper polymer layer 71, lower polymer layer 72, and tensile member 50 are heated to a temperature that facilitates bonding between the components. Depending upon the specific materials utilized for tensile member 50 and polymer layers 71 and 72, which form barrier 40, suitable temperatures may range from 120 to 200 degrees Celsius (248 to 392 degrees Fahrenheit) or more. Various radiant heaters or other devices may be utilized to heat the components of chamber 33. In some manufacturing processes, mold 60 may be heated such that contact between mold 60 and the components of chamber 33 raises the temperature of the components to a level that facilitates bonding.

Figure 10B:
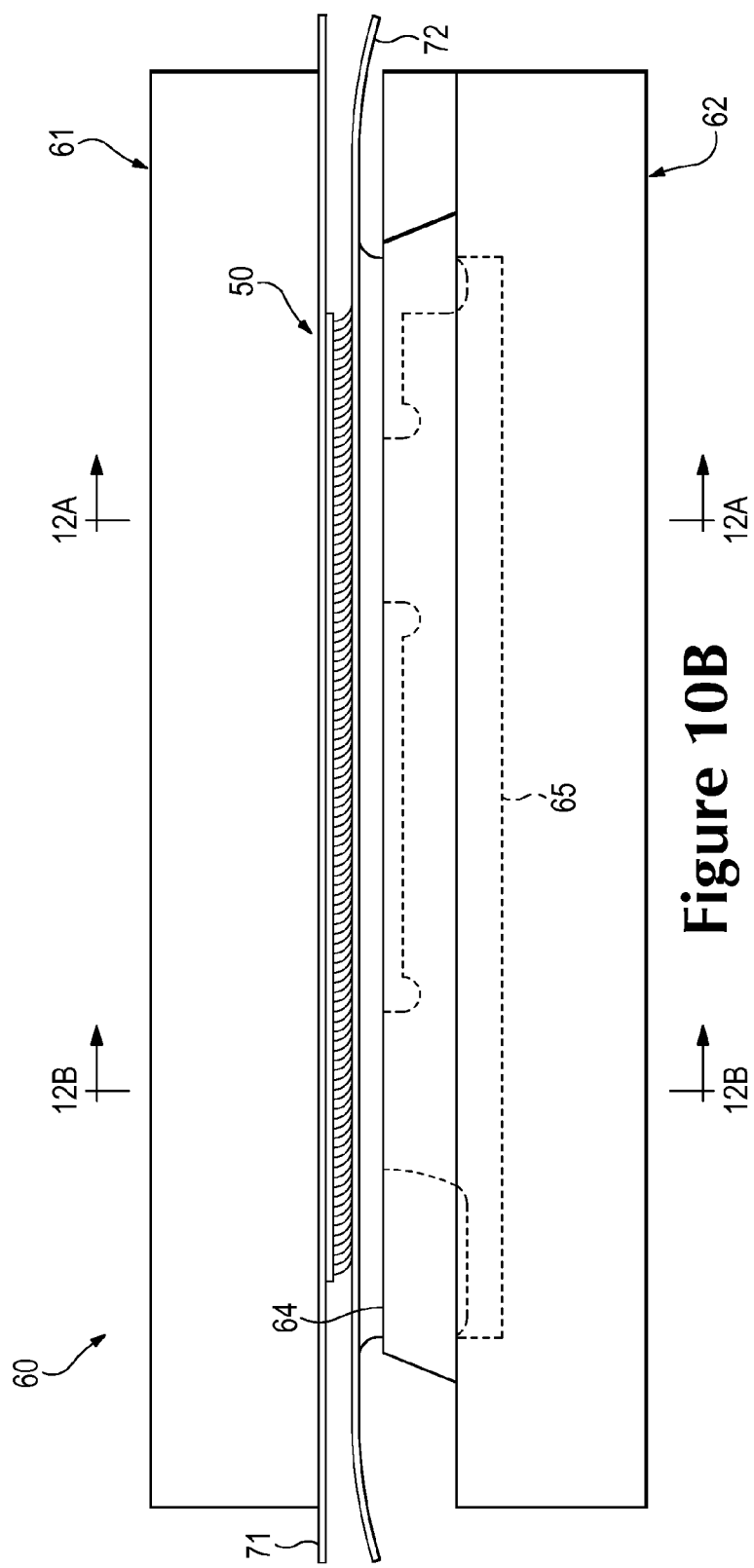
Figure 11A:
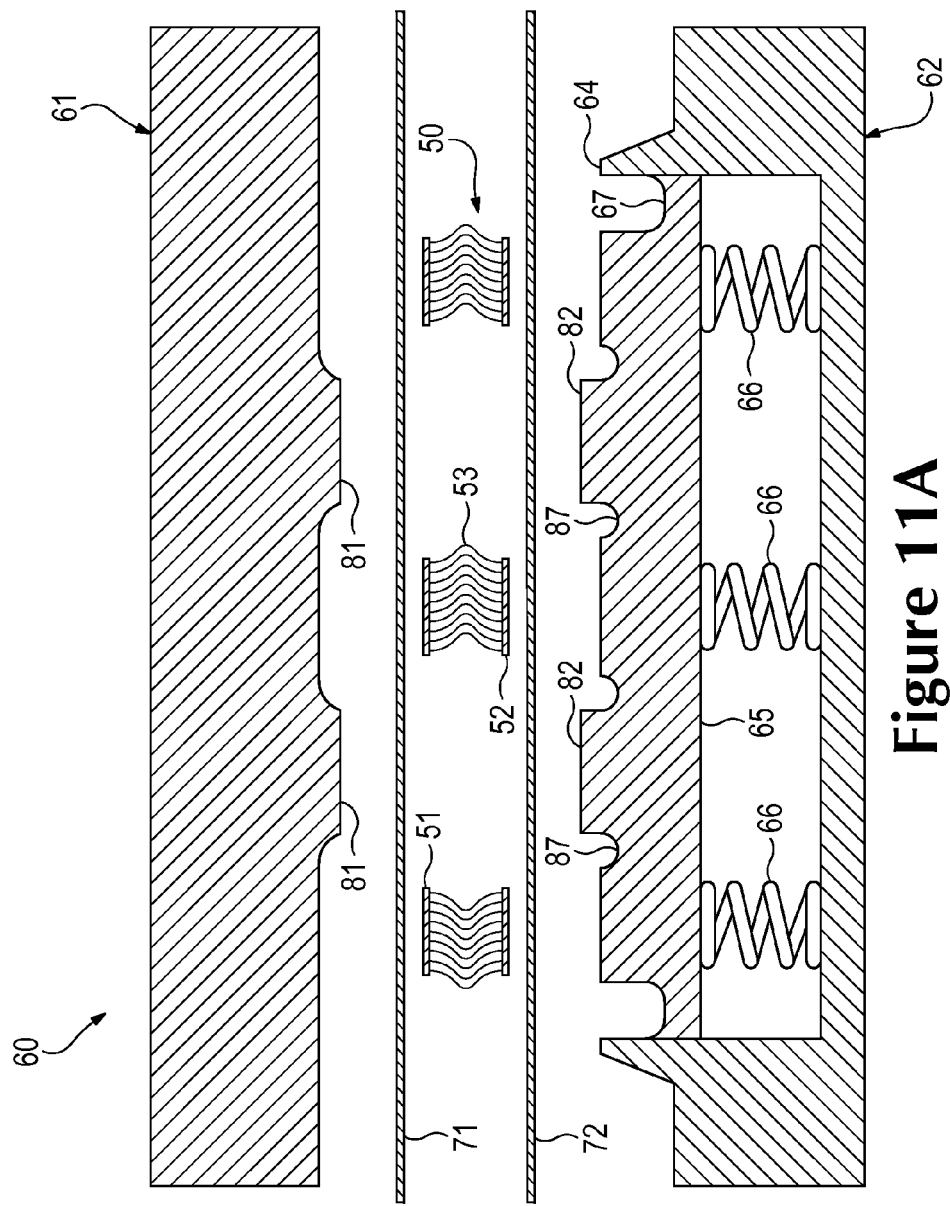
FIGS. 11A-11B are schematic cross-sectional views of the mold, as defined by section lines 11A-11A and 11B-11B in FIG. 10A, depicting a first step in the process for manufacturing the chamber.
Figure 11B:
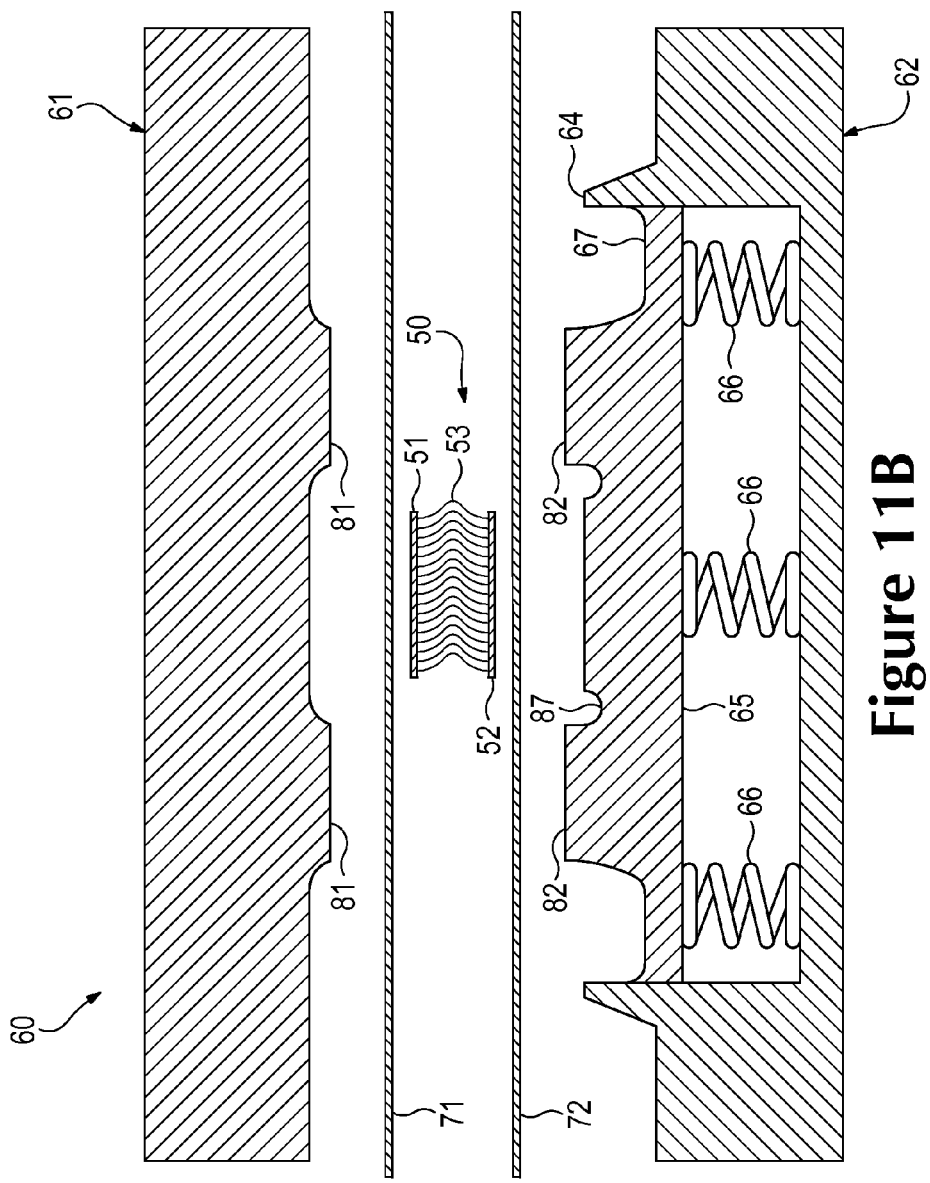
Figure 12A:
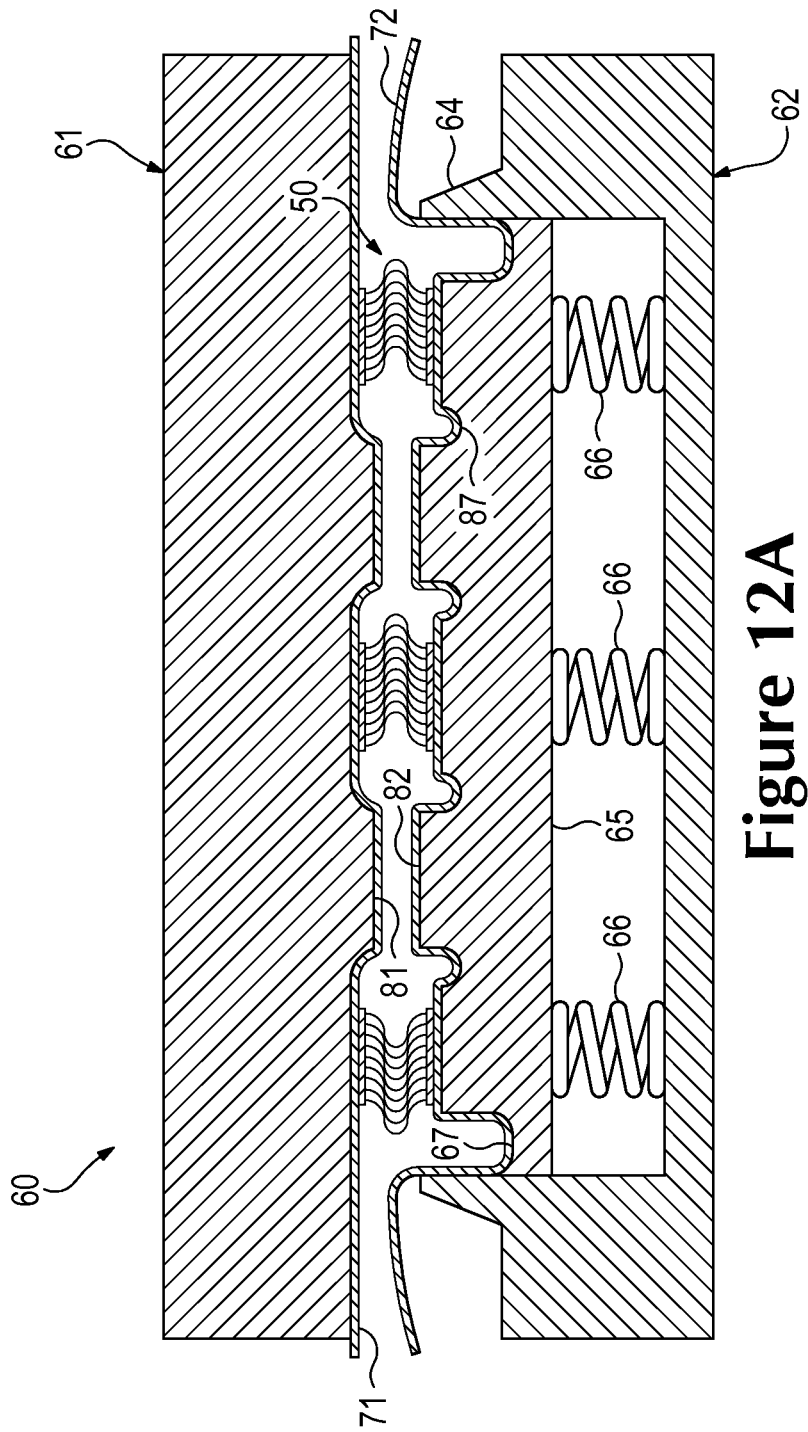
FIGS. 12A-12B are schematic cross-sectional views of the mold, as defined by section lines 12A-12A and 12B-12B in FIG. 10B, depicting a second step in the process for manufacturing the chamber.
Figure 12B:
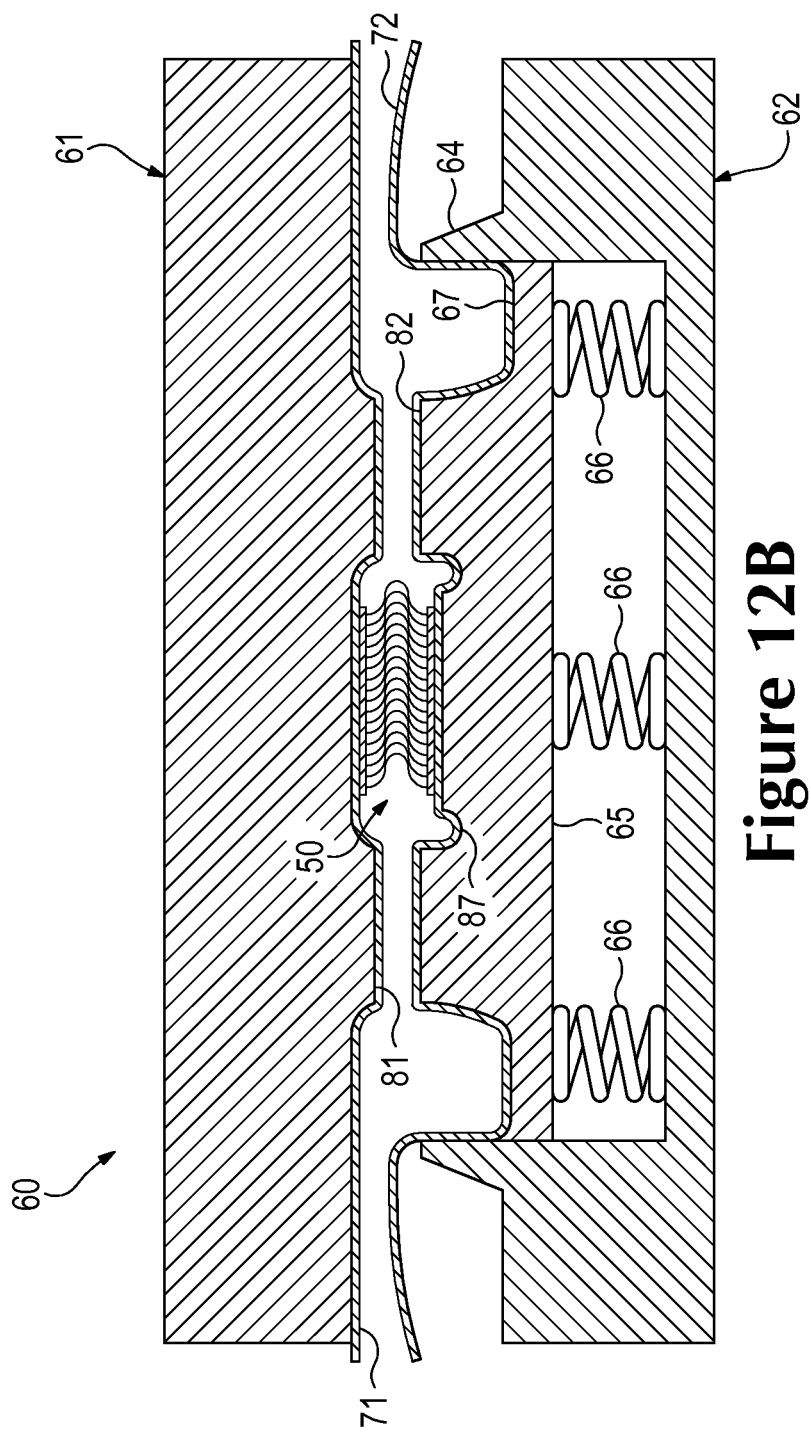

Following heating, the components of chamber 33 are located between mold portions 61 and 62, as depicted in FIGS. 10A and 11A-11B. In order to properly position the components, a shuttle frame or other device may be utilized. Once positioned, mold portions 61 and 62 translate toward each other and begin to close upon the components such that (a) upper mold portion 61 contacts upper polymer layer 71, (b) lower ridge 64 of lower mold portion 62 contacts lower polymer layer 72, and (c) polymer layers 71 and 72 begin bending around tensile member 50 so as to extend into a cavity within mold 60, as depicted in FIGS. 10B and 12A-12B. The components are thus located relative to mold 60 and initial shaping and positioning has occurred.

At the stage depicted in FIGS. 10B and 12A-12B, air may be partially evacuated from the area around polymer layers 71 and 72 through various vacuum ports in mold portions 61 and 62. The purpose of evacuating the air is to draw polymer layers 71 and 72 into contact with the various contours of mold 60. This ensures that polymer layers 71 and 72 are properly shaped in accordance with the contours of mold 60. Note that polymer layers 71 and 72 may stretch in order to extend around tensile member 50 and into mold 60. In comparison with the thickness of barrier 40 in chamber 33, polymer layers 71 and 72 may exhibit greater original thickness. This difference between the original thicknesses of polymer layers 71 and 72 and the resulting thickness of barrier 40 may occur as a result of the stretching taking place at this stage of the thermoforming process.

A movable insert 65 that is supported by various springs 66 may depress to place a specific degree of pressure upon the components, thereby bonding polymer layers 71 and 72 to opposite surfaces of tensile member 50. As mold 60 closes, upper pins 81 and lower pins 82 bond upper polymer layer 71 to lower polymer layer 72, thereby forming bonded regions 48, while internal indentations 87 form distended regions 49 from lower polymer layer 72.

Figure 10C:
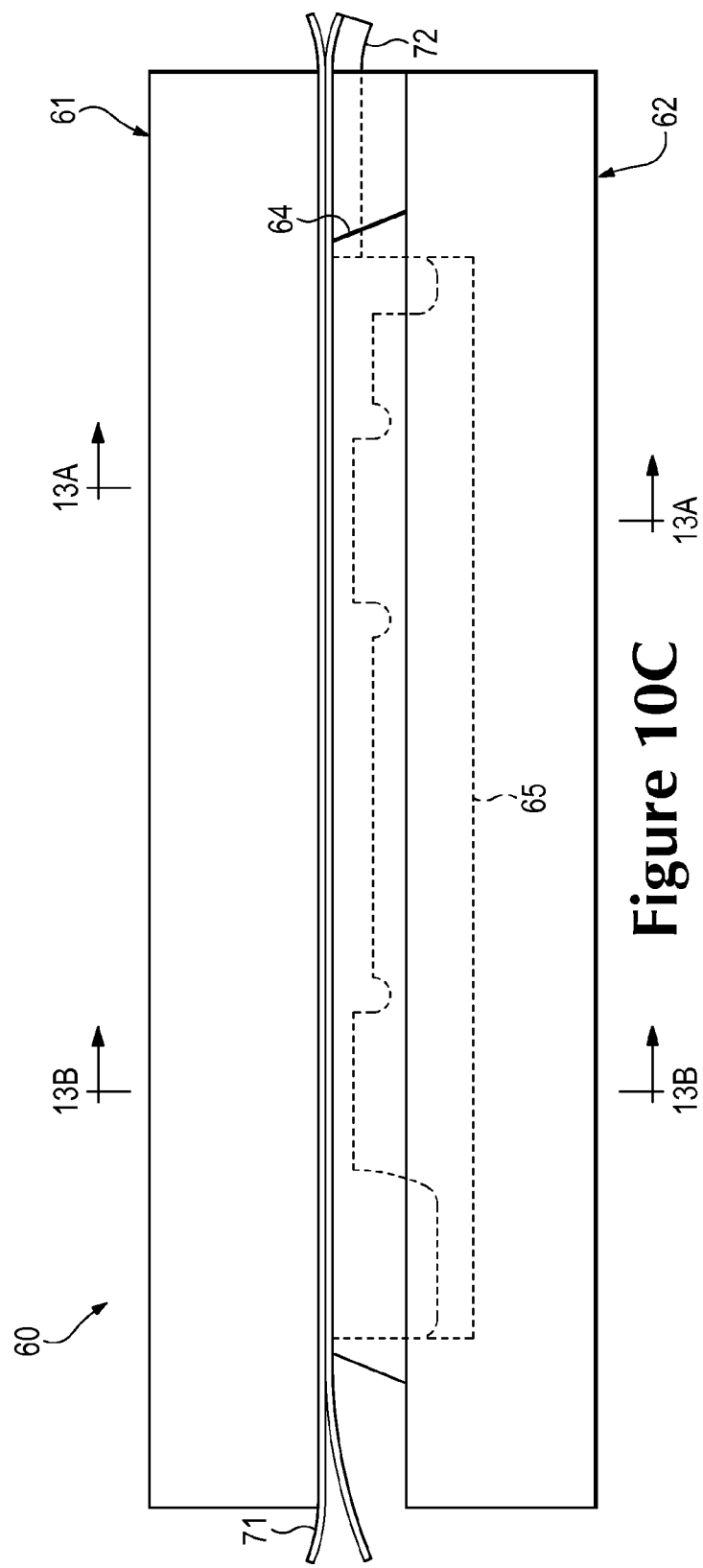
Figure 13A:
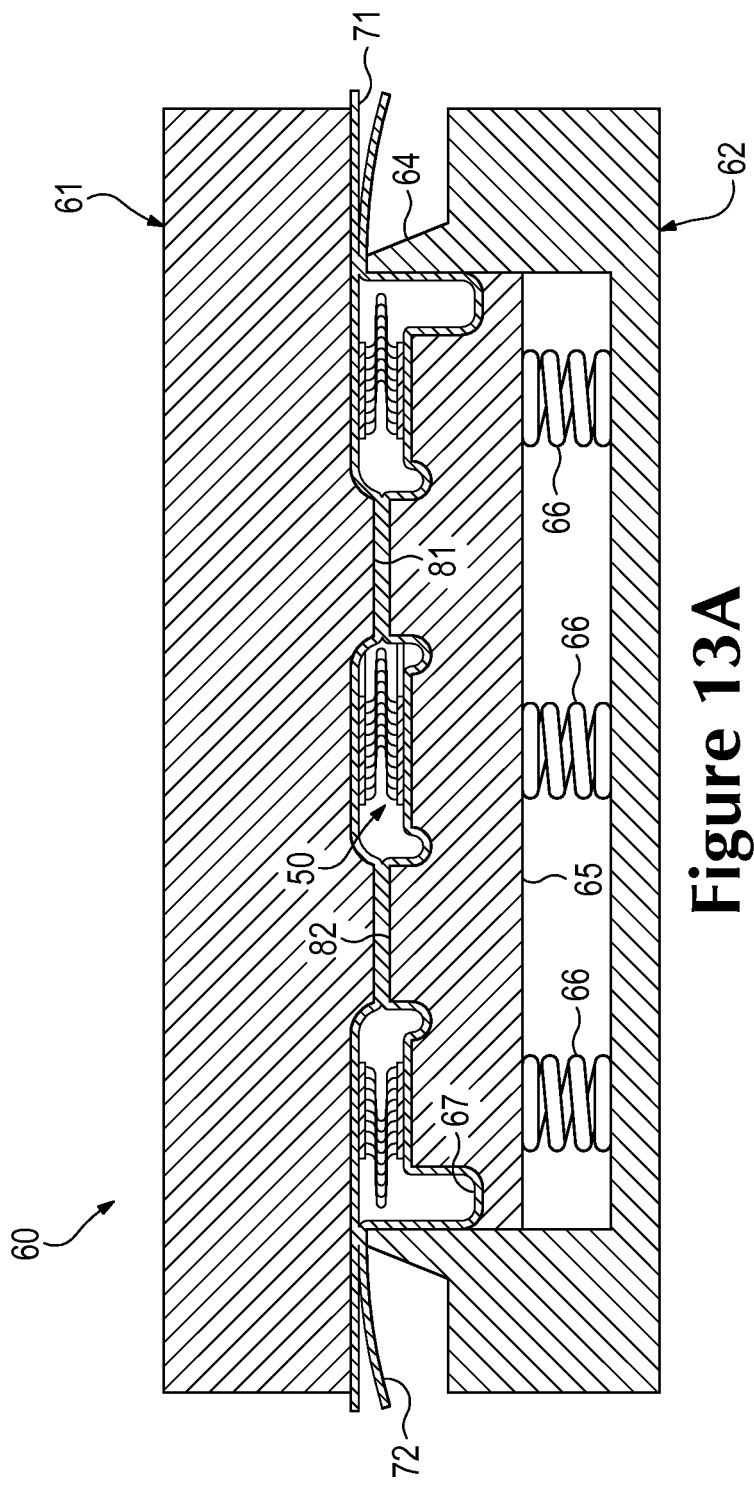
FIGS. 13A-13B are schematic cross-sectional views of the mold, as defined by section lines 13A-13A and 13B-13B in FIG. 10C, depicting a third step in the process for manufacturing the chamber.
Figure 13B:
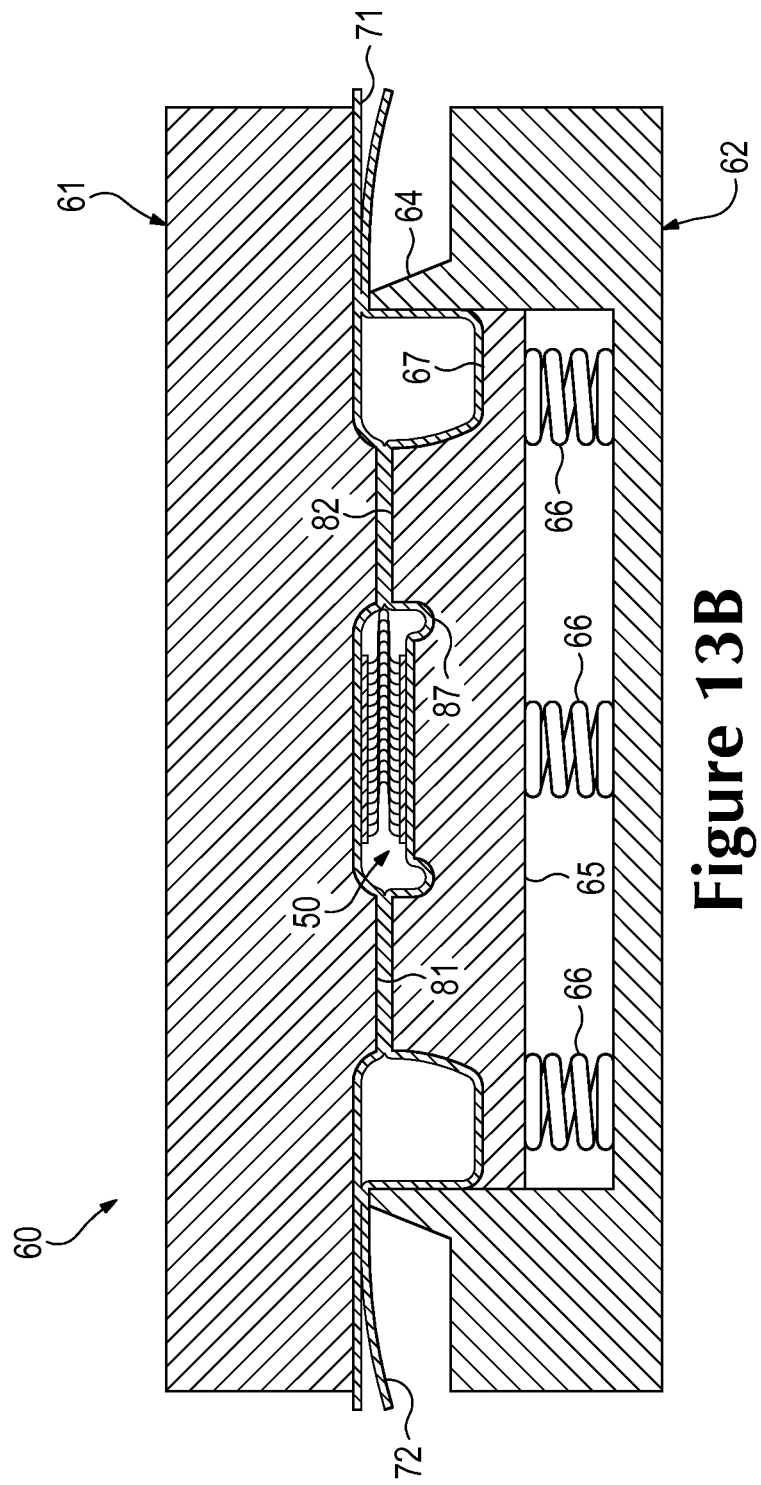

Movable insert 65 includes a peripheral indentation 67 that forms peripheral edge 43 from lower polymer layer 72. As mold 60 closes further, upper mold portion 61 and ridge 64 bond upper polymer layer 71 to lower polymer layer 72, as depicted in FIGS. 10C and 13A-13B, thereby forming peripheral bond 44. Furthermore, portions of upper mold portion 61 and ridge 64 that extend away from tensile member 50 form a bond between other areas of polymer layers 71 and 72, contributing to the formation of inflation conduit 73. In some configurations of mold 60, movable insert 65 and springs 66 may be absent, and features such as peripheral indentation 67, lower pins 82, and internal indentations 87 may instead be incorporated into lower mold portion 62. Furthermore, in some configurations of mold 60, portions of features such as peripheral indentation 67 and internal indentations 87 may be incorporated into upper mold portion 61 as well as, or instead of, being incorporated into movable insert 65 or lower mold portion 62.

In order to provide a second means for drawing polymer layers 71 and 72 into contact with the various contours of mold 60, the area between polymer layers 71 and 72 and proximal to tensile member 50 may be pressurized. During a preparatory stage of this method, an injection needle may be located between polymer layers 71 and 72, and the injection needle may be located such that upper mold portion 61 and ridge 64 envelop the injection needle when mold 60 closes. A gas may then be ejected from the injection needle such that polymer layers 71 and 72 engage upper mold portion 61 and ridge 64. Inflation conduit 73 may thereby be formed (see FIG. 10D) between polymer layers 71 and 72. The gas may then pass through inflation conduit 73, thereby entering and pressurizing the area proximal to tensile member 50 and between polymer layers 71 and 72. In combination with the vacuum, the internal pressure ensures that polymer layers 71 and 72 contact the various surfaces of mold 60.

As discussed above, a supplemental layer of a polymer material or thermoplastic threads may be applied to textile layers 51 and 52 in order to facilitate bonding between tensile member 50 and barrier 40. The pressure exerted upon the components by movable insert 65 ensures that the supplemental layer or thermoplastic threads form a bond with polymer layers 71 and 72.

Figure 10D:
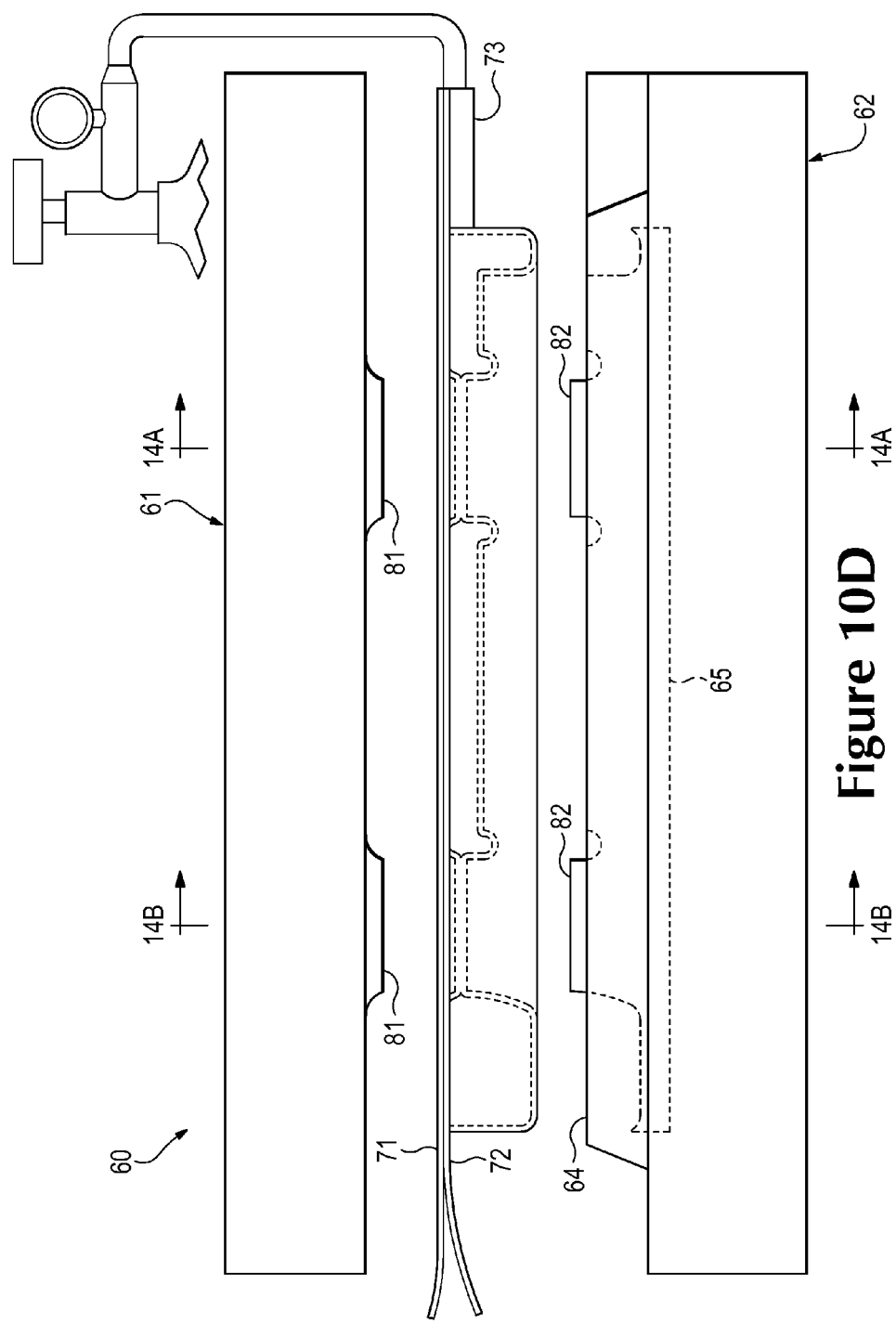
Figure 10E:
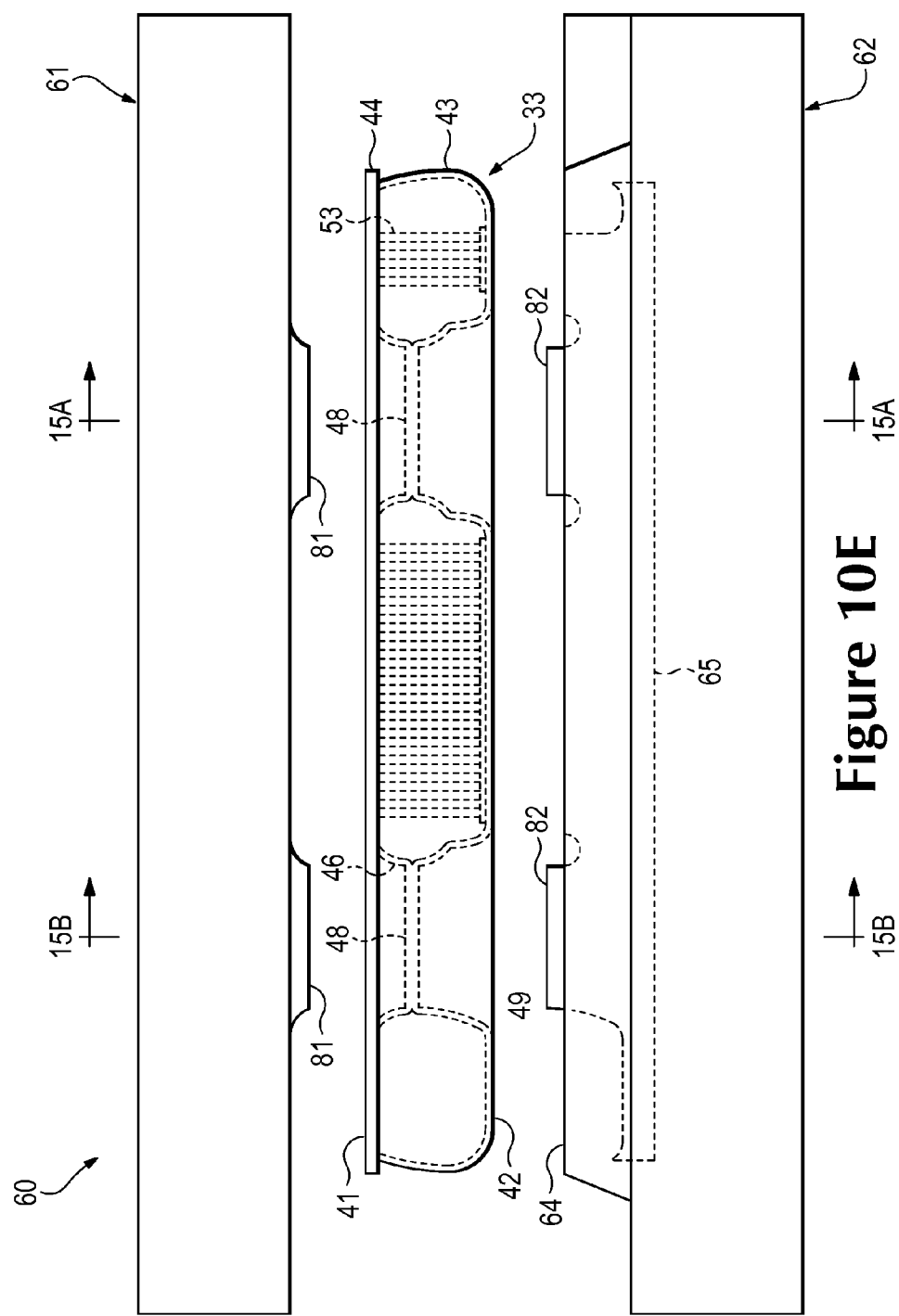
Figure 14A:
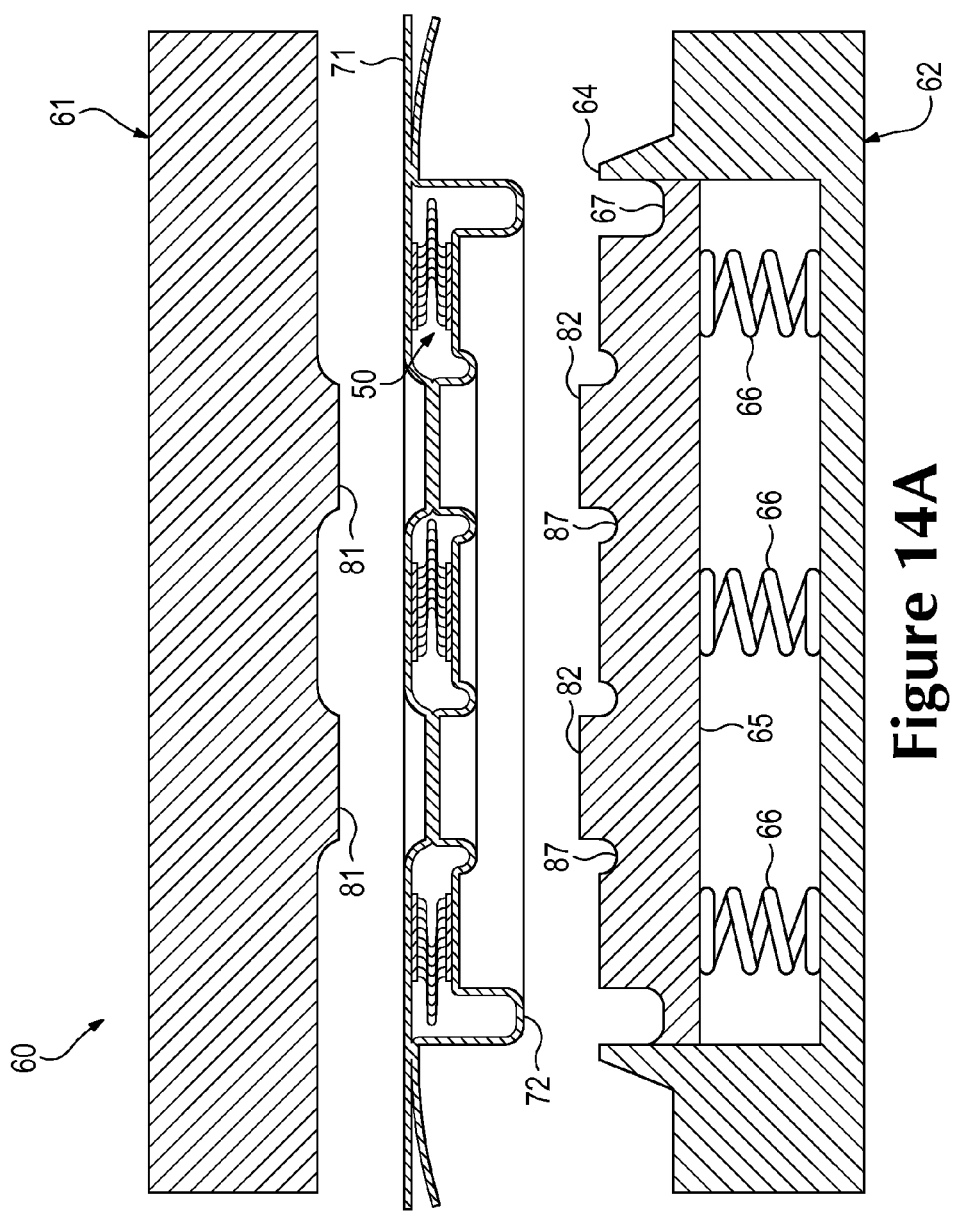
FIGS. 14A-14B are schematic cross-sectional views of the mold, as defined by section lines 14A-14A and 14B-14B in FIG. 10D, depicting a fourth step in the process for manufacturing the chamber.
Figure 14B:
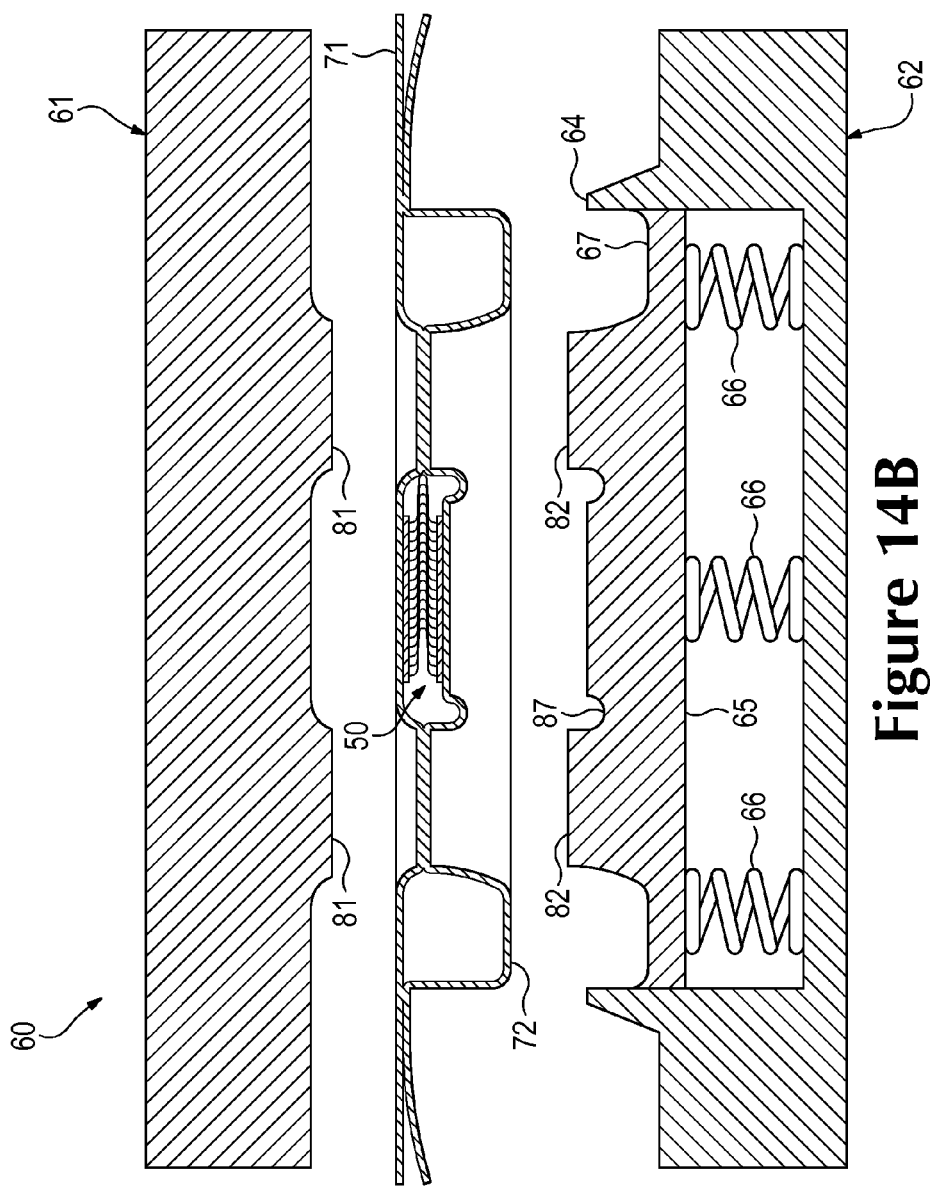
Figure 15A:
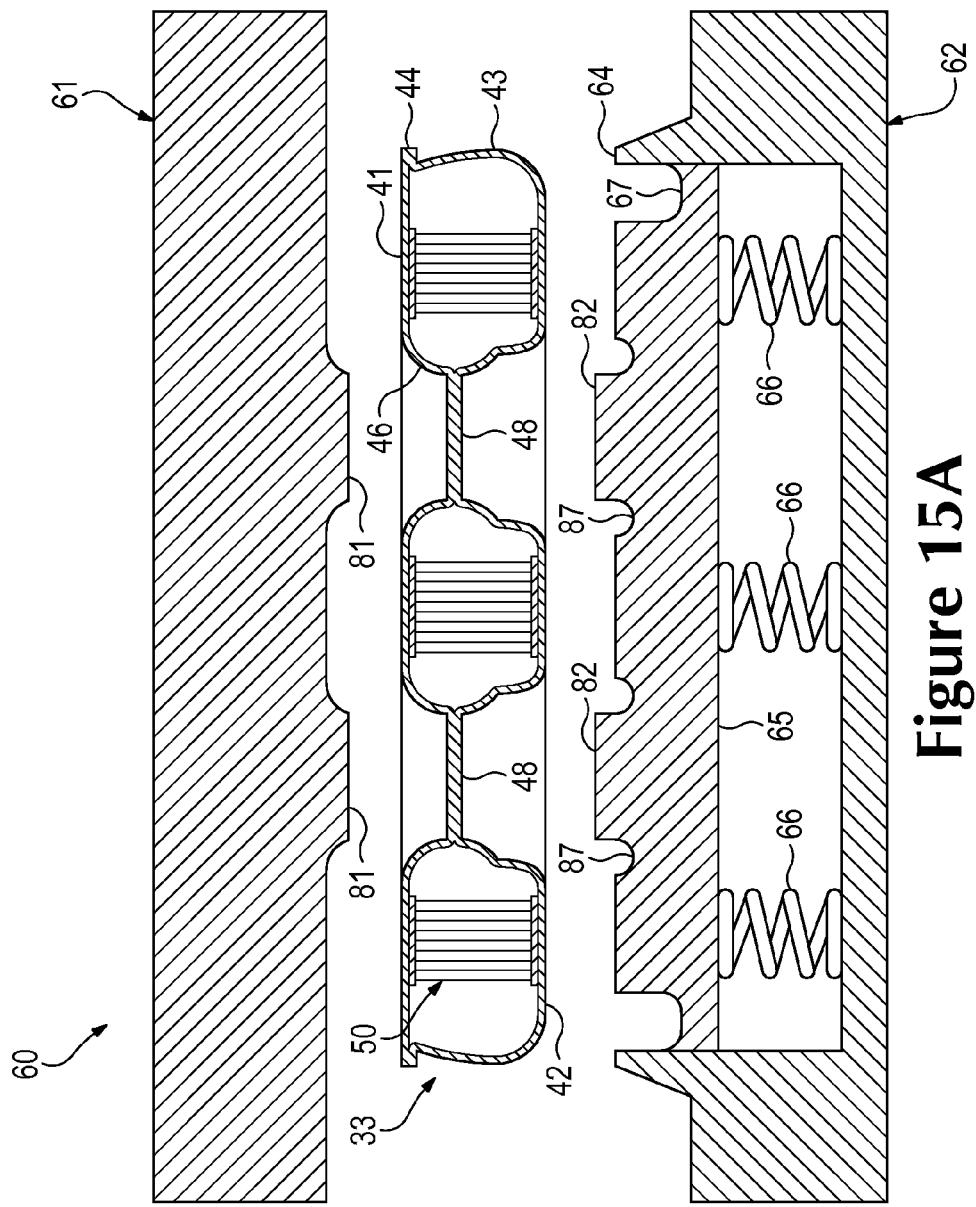
FIGS. 15A-15B are schematic cross-sectional views of the mold, as defined by section lines 15A-15A and 15B-15B in FIG. 10E, depicting a fifth step in the process for manufacturing the chamber.
Figure 15B:
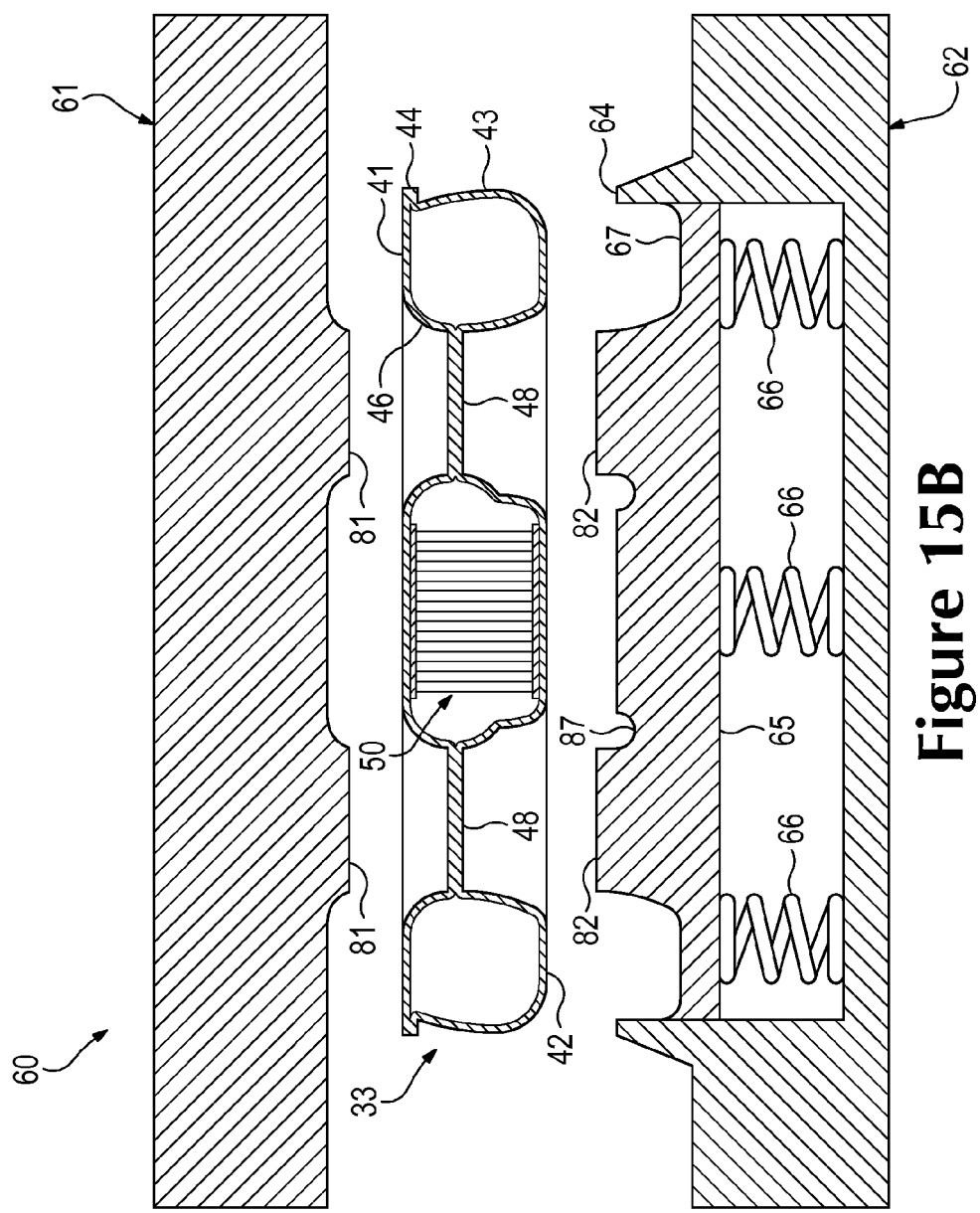

When bonding is complete, mold 60 is opened and chamber 33 and excess portions of polymer layers 71 and 72 are removed and permitted to cool, as depicted in FIGS. 10D and 14A-14B. A fluid may be injected into chamber 33 through the inflation needle and inflation conduit 73. Upon exiting mold 60, tensile member 50 remains in the compressed configuration. When chamber 33 is pressurized, however, the fluid places an outward force upon barrier 40, which tends to separate barrier portions 41 and 42, thereby placing tensile member 50 in tension and leading to the formation of indented areas 46. In addition, a sealing process is utilized to seal inflation conduit 73 adjacent to chamber 33 after pressurization. The excess portions of polymer layers 71 and 72 are then removed, thereby completing the manufacture of chamber 33, as depicted in FIGS. 10E and 15A-15B. As an alternative, the order of inflation and removal of excess material may be reversed. As a final step in the process, chamber 33 may be tested and then incorporated into midsole 31 of footwear 10.

Further Configurations

As depicted in FIGS. 4-8C, each bonded region 48 extend into different gaps 54. However, in other configurations, two or more bonded regions 48 may extend into the same gap 54. For example, as depicted in FIG. 16A, a gap 54 in tensile member 50 may be an aperture large enough for two bonded regions 58 to extend into.

As depicted in FIGS. 4-8C, chamber 33 extends through heel region 13 of footwear 10. However, in other configurations, chamber 33 may have an alternate extent. For example, as depicted in FIG. 16B, chamber 33 may extend through forefoot region 11 and midfoot region 12 of footwear 10. Alternatively, as depicted in FIG. 16C, chamber 33 may extend through substantially all of footwear 10.

Additionally, one or more regions of chamber 33 may be formed or shaped to accommodate additional portions of article of footwear 10. For example, in embodiments in which chamber 33 corresponds with substantially all of footwear 10, a cavity might be formed in midfoot region 12 of chamber 33 to accommodate an electrical or electronic device.

As depicted in FIGS. 4-8C, bonded regions 48 are (a) laterally-positioned in a heel-midfoot interface region of chamber 33, (b) medially-positioned in a heel-midfoot interface region of chamber 33, (c) laterally-positioned in a heel-most region of chamber 33, and (d) medially-positioned in a heel-most region of chamber 33. However, in other configurations, bonded regions 48 may be otherwise positioned along chamber 33. For example, as depicted in FIG. 16D, bonded regions 48 may be located anywhere along chamber 33, such as in a forefoot-most region, in a forefoot-midfoot interface region, or in a midfoot region. Additionally, bonded regions 48 may extend either into recesses in tensile member 50 or into apertures in tensile member 50 at any position along chamber 33. For example, in some configurations, bonded regions 48 may extend only into one or more recesses in tensile member 50 in various positions along chamber 33 and may not extend into any apertures in tensile member 50. Alternatively, in other configurations, bonded regions 48 may extend only into one or more apertures in tensile member 50 in various positions along chamber 33 and may not extend into any recesses in tensile member 50.

As depicted in FIGS. 4-8C, two bonded regions 48 are substantially symmetrically positioned in a heel-midfoot interface region of chamber 33, and two bonded regions 48 are substantially symmetrically positioned in a heel-most region of chamber 33. However, in other configurations, bonded regions 48 may be distributed along chamber 33 in a substantially non-symmetric manner. For example, as depicted in FIG. 16E, a bonded region 48 on one of either lateral side 14 or medial side 15 of chamber 33 may be positioned opposite more than one bonded region 48 on the other side of chamber 33, or the bonded region 48 may be positioned opposite no bonded regions 48 at all on the other side of chamber 33. For example, a single bonded region 48 may be positioned on lateral side 14, and may provide any of the advantages of bonded regions 48, such as an altered stability.

As depicted in FIGS. 4-8C, bonded regions 48 positioned on lateral side 14 of chamber 33 are substantially symmetrically positioned with respect to bonded regions 48 positioned on medial side 15 of chamber 33. However, in other configurations, bonded regions on lateral side 14 and medial side 15 may be otherwise positioned. For example, as depicted in FIG. 16F, bonded regions 48 positioned on lateral side 14 are closer to peripheral edge 43 than bonded regions 48 positioned on medial side 15.

As depicted in FIGS. 4-8C, each bonded region 48 substantially has the shape of a five-sided polygon. However, in other configurations, one or more bonded regions 48 may be otherwise shaped. For example, as depicted in FIG. 16G, bonded regions 48 may have shapes such as circles, squares, triangles, semicircles, trapezoids, or any other convex shape, regular or irregular.

As depicted in FIGS. 4-8C, each bonded region 48 has a convex shape. However, in other configurations, one or more bonded regions 48 may have non-convex shapes. For example, as depicted in FIG. 16H, bonded regions 48 may have shapes such as stars, crosses, crescents, the shape of the number "8," or any other non-convex shape, regular or irregular.

As depicted in FIGS. 4-8C, bonded regions 48 are roughly the same size, having a shortest dimension of between five and ten percent of a width of chamber 33. However, in other configurations, bonded regions 48 may have alternate sizes. For example, as depicted in FIG. 16I, bonded regions 48 may have a shortest dimension of less than five percent of a width of chamber 33, or more than ten percent of a width of chamber 33.

As depicted in FIGS. 4-8C, indented areas 46 have a substantially vertical cross-sectional configuration. However, in other configurations, indented areas 46 may be otherwise configured. For example, as depicted in FIG. 17A, indented areas 46 are configured to have a substantially leaning cross-sectional configuration.

As depicted in FIGS. 4-8C, bonded regions 48 are substantially parallel to the substantially flat configuration of chamber 33. However, in other configurations, bonded regions 48 may be otherwise related to the substantially flat configuration of chamber 33. For example, as depicted in FIG. 17B, bonded regions 48 may be angled to incline relative to the substantially flat configuration of chamber 33.

As depicted in FIGS. 4-8C, barrier 40 is formed to include distended regions 49 substantially corresponding to spaces between bonded regions 48 and tensile member 50. However, in other configurations, barrier 40 may be otherwise formed. For example, as depicted in FIG. 17C, barrier 40 may not include any distended regions.

As depicted in FIGS. 4-8C, barrier 40 is formed to include distended regions 49 that are within indented areas 46 of barrier layers 41 and 42. In distended regions 49, one or both of barrier layers 41 and 42 may be stretched in the molding process to facilitate greater outward expansion upon pressurization. However, in other configurations, distended regions 49 may be at least partially within protruding areas of barrier layers 41 and 42. For example, as depicted in FIG. 17D, protruding areas of chamber 33 extend outward in portions of barrier 40 corresponding to spaces between bonded regions 48 and tensile member 50, and distended regions 49 are partially within the protruding areas.

As depicted in FIGS. 4-8C, bonded regions 48 are continuous regions within indented areas 46. However, in other configurations, bonded regions 48 may be otherwise formed. For example, as depicted in FIG. 17E, bonded regions 48 may include holes 47 through barrier 40.

As depicted in FIGS. 4-8C, bonded regions 48 are positioned closer to the upper surface of chamber 33. However, in other configurations, bonded regions 48 maybe otherwise positioned. For example, as depicted in FIG. 17F, bonded regions 48 may be positioned substantially at a mid-point between the upper and lower surfaces of chamber 33. In further configurations, bonded regions 48 may be positioned closer to the lower surface of chamber 33.

Figure 18:
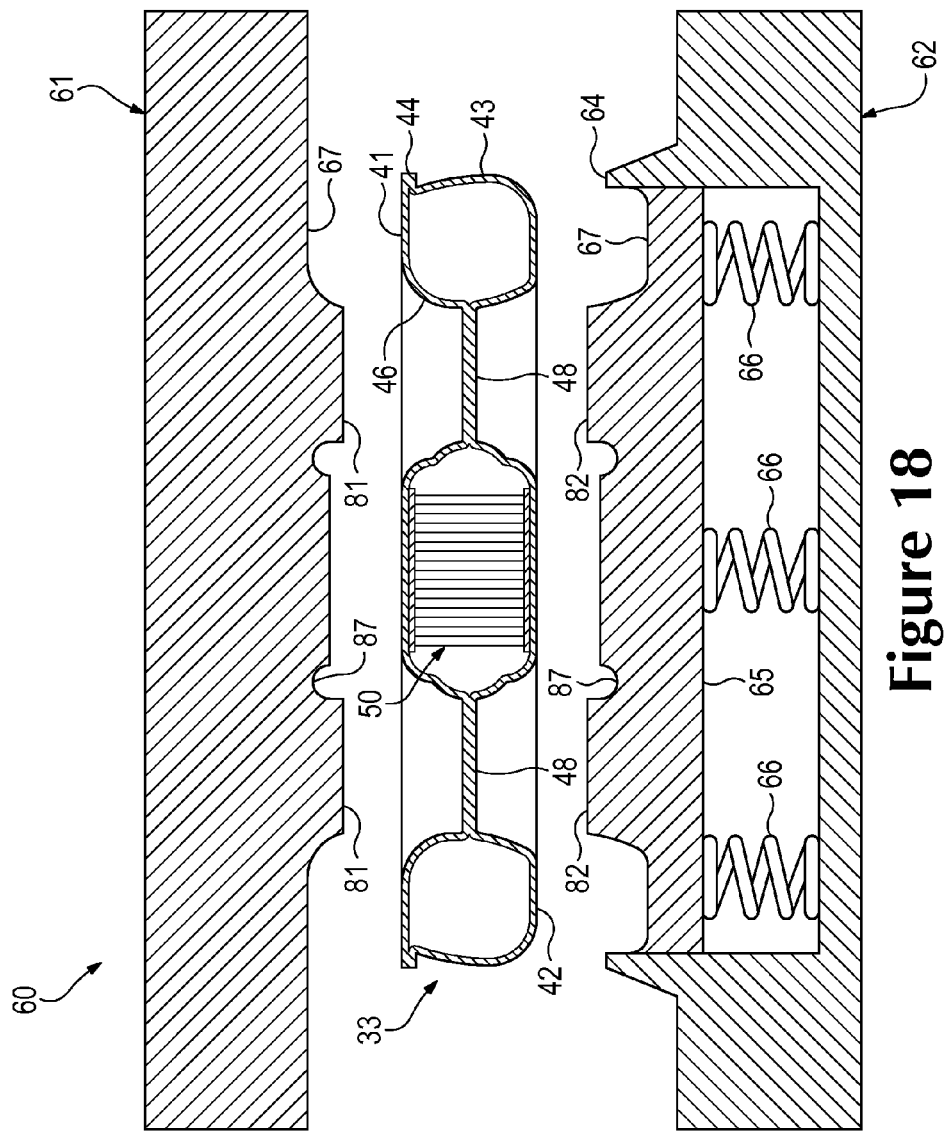
FIG. 18 is a schematic cross-sectional view corresponding with FIG. 15B and depicting an alternate configuration of a mold that may be utilized in a process for manufacturing the chamber.

As depicted in FIGS. 11A-15B, features such as peripheral indentation 67 and internal indentations 87 are incorporated into movable insert 65. However, in other configurations, various features of mold 60 may be otherwise configured. For example, as depicted in FIG. 18, peripheral indentation 67 and internal indentations 87 are partially incorporated into movable insert 65, and partially incorporated into upper mold portion 61.

Figure 19:
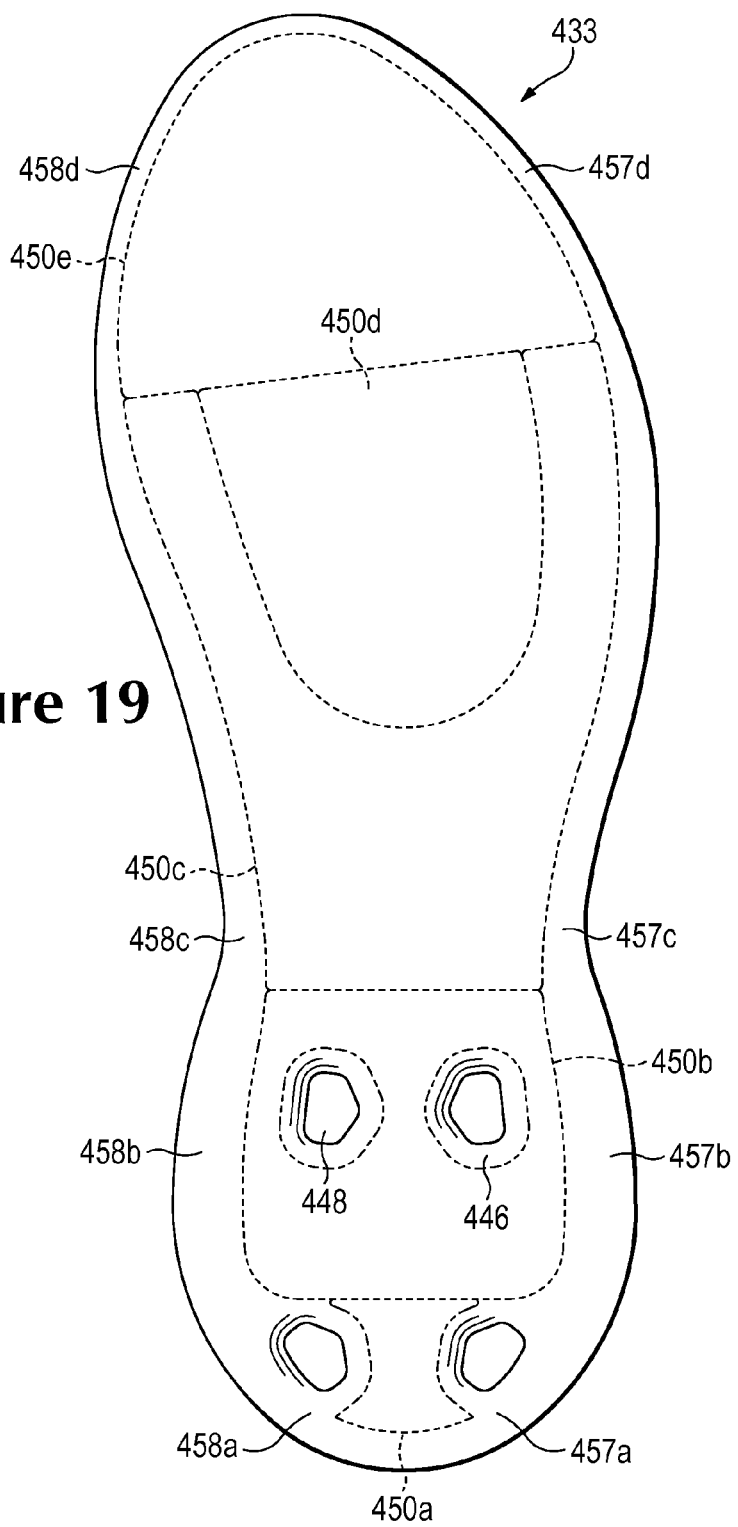
FIG. 19 is a top plan view of an alternate configuration of a fluid-filled chamber.
Figure 20:
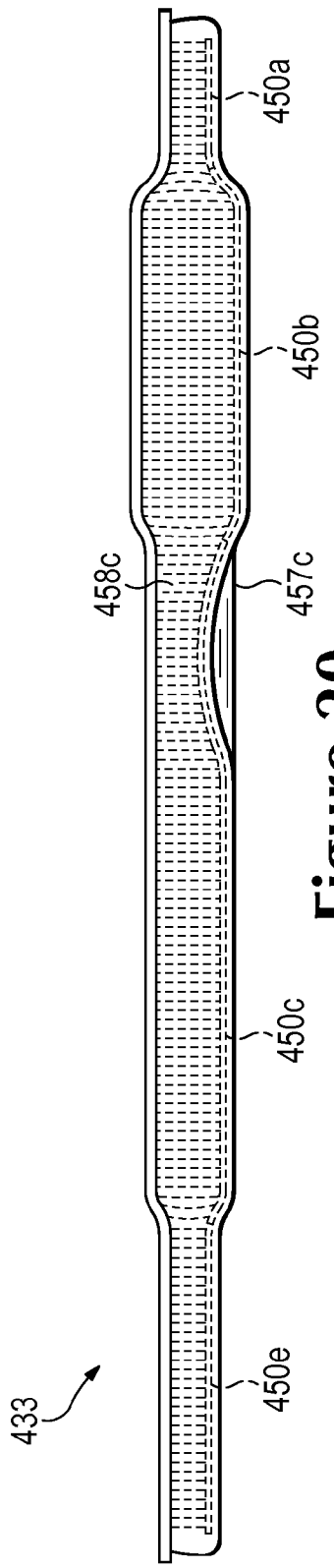
FIG. 20 is a medial side elevational view of the alternate configuration of the chamber.

Indented areas and bonded regions may be included in other fluid-filled chambers as well. For example, as depicted in FIGS. 19 and 20, indented areas 446 and bonded regions 448 have been included in fluid-filled chamber 433 along with other elements. Chamber 433 includes indented areas 446 and bonded regions 448. Chamber 433 also includes tensile members 450a-450e, whose heights may differ, which may in turn impart a contour to chamber 433. Additionally, chamber 433 includes a window portion having both first window areas 457a-457d and opposite second window areas 458a-458d, which may have different extents of outward protrusion, including a variation between a lateral side and a medial side of chamber 433.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. An article of footwear incorporating a sole structure, the sole structure comprising:
   a midsole formed from a polymer foam material;
   a fluid-filled chamber incorporated with the midsole, the fluid-filled chamber including:
      an outer barrier having an upper portion, an opposite lower portion, and a peripheral edge, at least one of the upper portion and the lower portion forming a laterally-positioned indented area and a medially-positioned indented area, the indented areas being spaced inward from the peripheral edge and extending into the chamber, and the upper portion and lower portion being bonded together in a laterally-positioned bonded region and a medially-positioned bonded region, the laterally-positioned bonded region being located within the laterally-positioned indented area, and the medially-positioned bonded region being located within the medially-positioned indented area, and
      a tensile member located within the outer barrier, the tensile member having a pair of apertures, one of the pair of apertures being a laterally-positioned aperture, and one of the pair of apertures being a medially-positioned aperture; and
   an outsole secured to at least one of the midsole and the fluid-filled chamber, the outsole forming at least part of a ground-contacting surface of the footwear;
   wherein the laterally-positioned indented area extends at least partially into the laterally-positioned aperture, and the medially-positioned indented area extends at least partially into the medially-positioned aperture, wherein the polymer foam material extends into and fills each of the laterally-positioned indented area and the medially-positioned indented area, wherein at least one of the upper portion and the lower portion forms an additional pair of indented areas spaced inward from the peripheral edge and extending into the chamber, the additional pair of indented areas being positioned in a heel-most region of the footwear, and wherein the tensile member further includes at least one recess, and each indented area of the additional pair of indented areas is located within a recess.

2. The article of footwear of claim 1, wherein each of the bonded regions has a convex shape.

3. The fluid-filled chamber of claim 1, wherein a distal boundary of each of the bonded regions is parallel with a portion of the peripheral edge of the chamber nearest to the distal boundary.

4. The article of footwear of claim 1, wherein the fluid-filled chamber extends through all of the article of footwear.

5. The article of footwear of claim 1, wherein both the laterally-positioned bonded region and the medially-positioned bonded region are spaced inward from the peripheral edge.

6. The article of footwear of claim 1, wherein both the laterally-positioned bonded region and the medially-positioned bonded region are at least partially spaced from the tensile member.

7. The article of footwear of claim 1, wherein the polymer foam material extends into and fills both indented areas of the additional pair of indented areas.

8. The article of footwear of claim 1, wherein one of the indented areas of the additional pair of indented areas is an additional laterally-positioned indented area, and one of the indented areas of the additional pair of indented areas is an additional medially-positioned indented area.

9. The article of footwear of claim 1, wherein the upper portion and lower portion are bonded together in (a) an additional laterally-positioned bonded region, and (b) an additional medially-positioned bonded region.

10. The article of footwear of claim 9, wherein both the additional laterally-positioned bonded region and the additional medially-positioned bonded region have a convex shape.

11. The article of footwear of claim 9, wherein a distal boundary of each of the additional laterally-positioned bonded region and the additional medially-positioned bonded region is parallel with a portion of the peripheral edge of the chamber nearest to the distal boundary.

12. The article of footwear of claim 9, wherein each of the additional laterally-positioned bonded region and the additional medially-positioned bonded region is spaced inward from the peripheral edge.

13. The article of footwear of claim 9, wherein each of the additional laterally-positioned bonded region and the additional medially-positioned bonded region is at least partially spaced from the tensile member.

* * * * *